United States Patent
Griffin et al.

(10) Patent No.: US 9,134,810 B2
(45) Date of Patent: Sep. 15, 2015

(54) NEXT LETTER PREDICTION FOR VIRTUAL KEYBOARD

(75) Inventors: Jason Tyler Griffin, Kitchener (CA); Jerome Pasquero, Montreal (CA); Donald Somerset McCulloch Mckenzie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 12 days.

(21) Appl. No.: 13/589,405

(22) Filed: Aug. 20, 2012

(65) Prior Publication Data

US 2013/0187857 A1    Jul. 25, 2013

Related U.S. Application Data

(60) Provisional application No. 61/588,534, filed on Jan. 19, 2012.

(51) Int. Cl.
*G06F 3/041* (2006.01)
*G06F 3/023* (2006.01)
*G06F 3/0488* (2013.01)

(52) U.S. Cl.
CPC .......... *G06F 3/0237* (2013.01); *G06F 3/04886* (2013.01); *G06F 3/041* (2013.01)

(58) Field of Classification Search
CPC .......................... G06F 3/0237; G06G 3/04886
USPC .......................... 345/156, 168–169, 173, 179
See application file for complete search history.

(56) References Cited

U.S. PATENT DOCUMENTS

| | | | |
|---|---|---|---|
| 5,963,671 A | 10/1999 | Comerford et al. | |
| 6,646,572 B1 * | 11/2003 | Brand | 341/22 |
| 7,098,896 B2 * | 8/2006 | Kushler et al. | 345/168 |
| 2005/0071778 A1 | 3/2005 | Tokkonen | |
| 2007/0046641 A1 * | 3/2007 | Lim | 345/173 |
| 2008/0316183 A1 * | 12/2008 | Westerman et al. | 345/173 |
| 2009/0259962 A1 * | 10/2009 | Beale | 715/773 |
| 2010/0225599 A1 * | 9/2010 | Danielsson et al. | 345/173 |
| 2011/0007004 A1 | 1/2011 | Huang | |
| 2011/0201387 A1 * | 8/2011 | Paek et al. | 455/566 |
| 2011/0319139 A1 * | 12/2011 | Kondo | 455/566 |
| 2012/0149477 A1 | 6/2012 | Park | |

FOREIGN PATENT DOCUMENTS

| | | |
|---|---|---|
| EP | 1126364 | 8/2001 |
| EP | 2149837 | 2/2010 |
| WO | 2010035574 A1 | 4/2010 |

OTHER PUBLICATIONS

Extended European Search Report; EP 12181043.6; Mar. 11, 2013.

(Continued)

*Primary Examiner* — Lun-Yi Lao
*Assistant Examiner* — Jarurat Suteerawongsa
(74) *Attorney, Agent, or Firm* — Ridout & Maybee LLP

(57) ABSTRACT

A method including receiving an input of a character from a virtual keyboard displayed on a display, generating one or more sets of predicted input characters based on the input character, wherein each set of predicted input characters corresponds to a subsequent candidate input character, and displaying a visual indication of at least some of the one or more sets of predicted input characters, wherein the visual indication is displayed at keys of the virtual keyboard associated with subsequent candidate input characters corresponding to the sets of predicted input characters.

19 Claims, 34 Drawing Sheets

(56) References Cited

OTHER PUBLICATIONS

European Patent Office, "Communication Pursuant to Article 94(3) EPC" for European Patent Application No. 12 181 043.6 dated Feb. 3, 2014.

Canadian Intellectual Property Office, "Requisition by the Examiner in Accordance with Subsection 30(2) of the Patent Rules", Jun. 16, 2014.

European Patent Office, "Communication pursuant to Article 94(3) EPC", Sep. 17, 2014.

Popa, Cristina—Canadian Intellectual Property Office, "Examiner's Requisition" for corresponding Canadian Patent Application No. 2,786,502, dated Apr. 7, 2015, Canada.

* cited by examiner

NEXT LETTER PREDICTION FOR VIRTUAL KEYBOARD

RELATED APPLICATION DATA

The present application claims priority to and the benefit of provisional U.S. patent application Ser. No. 61/588,534, filed Jan. 19, 2012, which is incorporated herein by reference in its entirety. The present disclosure also relates to commonly owned U.S. patent application Ser. No. 13/373,356, filed Nov. 10, 2011, which is incorporated herein by reference in its entirety.

TECHNICAL FIELD

The present disclosure relates generally to input methodologies for electronic devices, such as handheld electronic devices, and more particularly, to methods for receiving predictive text input and generation of a set of characters for electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
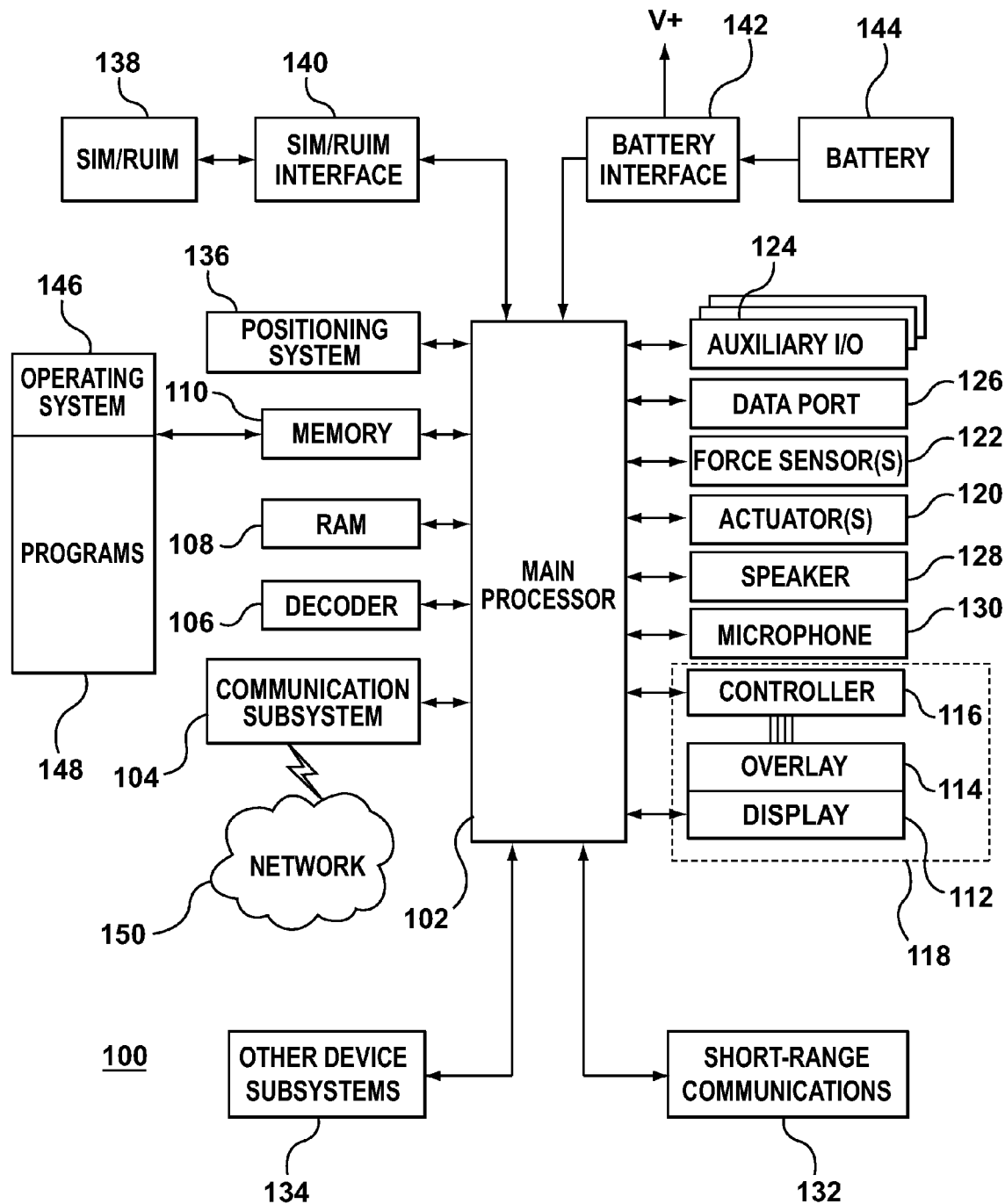
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap keys in the virtual keyboard, and often choose predictions as an input accelerator rather than auto-correction. This usage pattern corresponds most closely with novice/new touchscreen users as well as potentially one-handed (thumb) use situations.

Accordingly, example embodiments described herein permit the user of an electronic device to input characters without diverting attention from the keyboard and subsequently refocusing.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). Therefore, the term "the generated set of characters" as used in "displaying the generated set of characters" includes displaying one or more generated set of characters. References to orientation contained herein, such as horizontal and vertical, are relative to the screen orientation of a graphical user interface rather than any physical orientation.

In one embodiment, a method is provided that comprises receiving an input of a character from a virtual keyboard displayed on a display; generating one or more sets of predicted input characters based on the input character; and displaying one or more of the generated sets of predicted input characters within the virtual keyboard at a location proximate to a key corresponding to a subsequent candidate input character in the one or more generated sets of predicted input characters.

In another embodiment, a method is provided that comprises receiving an input of a character from a virtual keyboard displayed on a display, generating one or more sets of predicted input characters based on the input character, wherein each set of predicted input characters corresponds to a subsequent candidate input character, and displaying a visual indication of at least some of the one or more sets of predicted input characters, wherein the visual indication is displayed at keys of the virtual keyboard associated with subsequent candidate input characters corresponding to the sets of predicted input characters.

In other embodiments, there is provided an electronic device which comprises a processor and a touchscreen display having a virtual keyboard displayed thereupon coupled to the processor. The processor is configured to perform the methods described herein.

In other embodiments, there is provided a graphical user interface (GUI) displayed on a display of an electronic device. The GUI includes a virtual keyboard displayed on a touchscreen display and is configured to perform the methods described herein. In one example, there is provided a keyboard rendered on a touchscreen display of an electronic device, the keyboard comprising: a plurality of keys, each key corresponding to one or more different characters of a plurality of characters; wherein in response to receiving an input of a character, the keyboard is configured to generate one or more sets of predicted input characters based on the input character, wherein each set of predicted input characters corresponds to a subsequent candidate input character, and display a visual indication of at least some of the one or more sets of predicted input characters, wherein the visual indication is displayed at keys of the virtual keyboard associated with subsequent candidate input characters corresponding to the sets of predicted input characters.

These example embodiments, as well as those described below permit the user of an electronic device to input a set of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered and displayed on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

Main processor 102 can also interact with an orientation sensor 197 for sensing the orientation of the device. In some examples, the orientation sensor 197 may be one or more accelerometers. In some examples, the orientation sensor may detect acceleration along multiple orthogonal axes. Main processor 102 can also interact with one or more proximity sensors 198 for detecting the proximity of nearby objects. In some examples, the proximity sensor may be one or more infrared emitter/sensor pairs. The main processor 102 can also interact with an ambient light sensor 199 for detecting the intensity and/or color temperature of ambient light.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
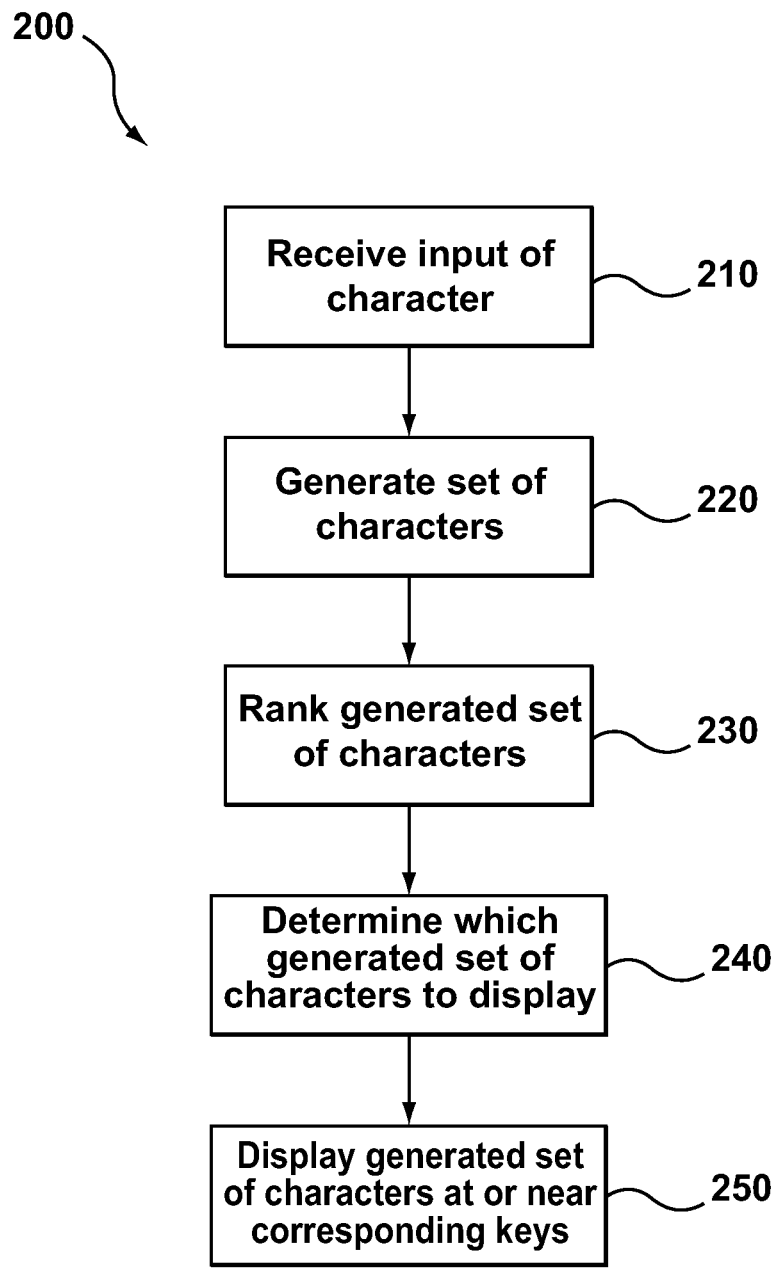
FIG. 2 is a flowchart illustrating an example method for predicting a selected set of characters, consistent with embodiments disclosed herein.

FIG. 2 is a flowchart illustrating an example method 200 for predicting a set of characters, consistent with example embodiments disclosed herein. As used herein, a predictor (such as a predictive algorithm, program or firmware) includes a set of instructions that when executed by a processor (for example, main processor 102), can be used to disambiguate for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict a set of characters potentially contemplated by the user based on several factors, such as context, frequency of use, and others as appreciated by those skilled in the field. The predictor may predict a set of characters which completes a received text input (known as auto-completion), correct received text input (known as auto-correction), or a combination thereof (e.g., completing the text input while correcting previously entered text input).

For example, in the predictor is a program 148 residing in memory 110 of electronic device 100. Accordingly, method 200 includes a predictor for generating a set of characters corresponding to a subsequent candidate input character based on inputted characters. It can be appreciated that while the example embodiments described herein are directed to a predictor program executed by a processor, the predictor can be executed by a virtual keyboard controller.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like.

The inputted character can be displayed in an input field (for example, input field 330 further described below in FIGS. 3-9) that displays the character the user inputs using the virtual keyboard.

At block 220, the processor generates one or more sets of characters such as words or phrases, acronyms, names, slang, colloquialisms, abbreviations, or any combination thereof based on the input received in block 210. The set of characters includes, for example, a set of characters that are stored in a dictionary (for example, a word or an acronym) of a memory of the electronic device, a set of characters that were previously inputted by user (for example, a name or acronym), a set of characters based on a hierarchy or tree structure, a combination thereof, or any set of characters that are selected by a processor based on defined arrangement.

In some embodiments, the processor can use contextual data for generating a set of characters. Contextual data considers the context of characters in the input field. Contextual data can include information about, for example, set of characters previously inputted by the user, grammatical attributes of the characters inputted in the input field (for example, whether a noun or a verb is needed as the next set of characters in a sentence), or any combination thereof. For example, if the set of characters "the" has already been inputted into display, the processor can use the contextual data to determine that a noun—instead of a verb—will be the next set of characters after "the". Likewise, if the set of characters "Guy Lafleur played in the National Hockey" was inputted, based on the context, the processor can determine the subsequent set of characters is likely "League". Using the contextual data, the processor can also determine whether an inputted character was incorrect. For example, the processor can determine that the inputted character was supposed to be a "w" instead of an "a", given the proximity of these characters on a QWERTY virtual keyboard.

Processor 102 can also include an affix as part of the set of characters, such as an adverb ending, an adjective ending, different verb tenses, and the like, or any other change to make a complete set of characters. Processor 102 can also use the received input to generate affixes, such as plural endings or plural forms. Any known predictive technique or software can be used to process the received input and the contextual data in generating set of characters at block 220.

In some example embodiments, the set of characters generated at block 220 can begin with the same character received as input at block 210. For example, if the characters "pl" have been received as input using a virtual keyboard, these characters will be received by the processor as the input. In these embodiments, the set of characters generated at block 220 would all begin with "pl", such as "please" or "plot." There is no limit on the length of a generated set of characters. Regarding affixes, if the user has input the characters "child", for example, the affixes generated at block 220 could include "-ren", to make the set of characters "children", or "-ish", to make the set of characters "childish".

In some example embodiments, the set of characters generated at block 220 can simply include the same characters received as input at block 210. For example, if the received input is an "x," the processor may generate "example" or "xylophone" as the set of characters. Such sets of characters can be generated using the contextual data.

In another example embodiment, if input has not been received or a delimiter (such as a <SPACE>) has been used, the generated set of characters can be placed on subsequent candidate input characters that correspond to the first letter of the generated set of characters.

Next, at block 230, the generated set of characters from block 220 can be ranked. The rankings reflect the likelihood that a candidate set of characters might have been intended by the user, or might be chosen by a user compared to another candidate set of characters.

In some embodiments, contextual data can be included in the ranking at block 230. In some embodiments, the electronic device can be configured to rank nouns or adjectives higher based on the previous inputted set of characters. If the inputted set of characters is suggestive of a noun or adjective, the processor, using the contextual data, can rank the nouns or adjectives corresponding to what the user is typing higher at block 230. In an additional embodiment, set of characters including adjective affixes (such as "-ish" or "-ful"), phrases, plurals, or combinations thereof can also be ranked. Contextual data can increase the likelihood that the higher ranked generated set of characters is intended by a user. In some embodiments, contextual data can include information about which programs or applications are currently running or being used by a user. For example, if the user is running an email application, then set of characters associated with that user's email system, such as set of characters from the user's contact list, can be used to determine the ranking. N-grams, including unigrams, bigrams, trigrams, and the like, can be also used in the ranking of the sets of characters. Alternatively, the geolocation of the electronic device or user can be used in the ranking process. If, for example, the electronic device recognizes that a user is located at his/her office, then sets of characters generally associated with work can be ranked higher in the list. If, on the other hand, the device determines a user is at the beach, then sets of characters generally associated with the beach can be ranked higher in the list.

At block 240, the processor determines which of the set of characters to display based on the ranking. For example, higher ranked sets of characters are more likely to be determined that they should be displayed. A ranker (such as a ranking algorithm, program or firmware) includes a set of instructions that when executed by a processor (for example, main processor 102), can be executed to determine ranking in this regard. In some embodiments, the ranker is a program 146 residing in memory 110 of electronic device 100.

At block 250, the determined set of characters is displayed at a location on the keyboard corresponding to a subsequent candidate input character, predicted as the next character in a word that the user might input. For instance, if a user inputs "pl", the word "please" would be displayed on the key for the letter "e"—the subsequent candidate input character for that word. Similarly, the word "plus" would also be displayed on the key for the letter "u"—another subsequent candidate input character. The subsequent candidate input character can be any alphanumeric character, such as a letter, number, symbol, punctuation mark, and the like.

In some embodiments, the generated set of characters is displayed at or near keys on the virtual keyboard associated with the subsequent candidate input characters. Its placement at or near a key can depend, for instance, on the size of the word or the number of nearby subsequent candidate input characters and the size of their associated set of characters.

The set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

When identifying the set of characters for display at block 240, the processor can limit the displayed set of characters to the top few or choose among the higher ranked sets of characters. For example, if two sets of characters are both ranked high, and these sets of characters would otherwise be displayed at the same key, the electronic device could be configured to display only the highest ranked generated set of characters. In other embodiments, both sets of characters could be displayed at or around the same key, or one set of characters is displayed at one key while the second set of characters is displayed at another key. In some example embodiments, the processor can take into account the display size to limit the number of generated sets of characters.

In some embodiments, the ranking could be used to choose between two or more sets of characters that, when displayed on adjacent subsequent candidate input characters, would overlap with each other (e.g., because of their respective lengths). In such a scenario, the electronic device could be configured to display the higher ranked set of characters on the keyboard. For example, if the set of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking a set of characters that would be displayed on or around those keys. At block 240, it could be determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the set of characters, effectively permitting a long set of characters to be displayed within or mostly within the boundaries of a single key simultaneously with other sets of characters on adjacent keys of a virtual keyboard.

FIGS. 3-9 illustrate a series of example front views of the touchscreen 118 having a virtual keyboard 320, consistent with example embodiments disclosed herein. Starting with FIG. 3A, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, a virtual keyboard displays a set of characters at a location on the keyboard corresponding to a subsequent candidate input character that might be received as input from the user.

The examples and embodiments illustrated in FIGS. 3-9 can be implemented with any set of characters, such as words, phrases, acronyms, names, slang, colloquialisms, abbreviations, or any combination thereof.

Figure 3A:
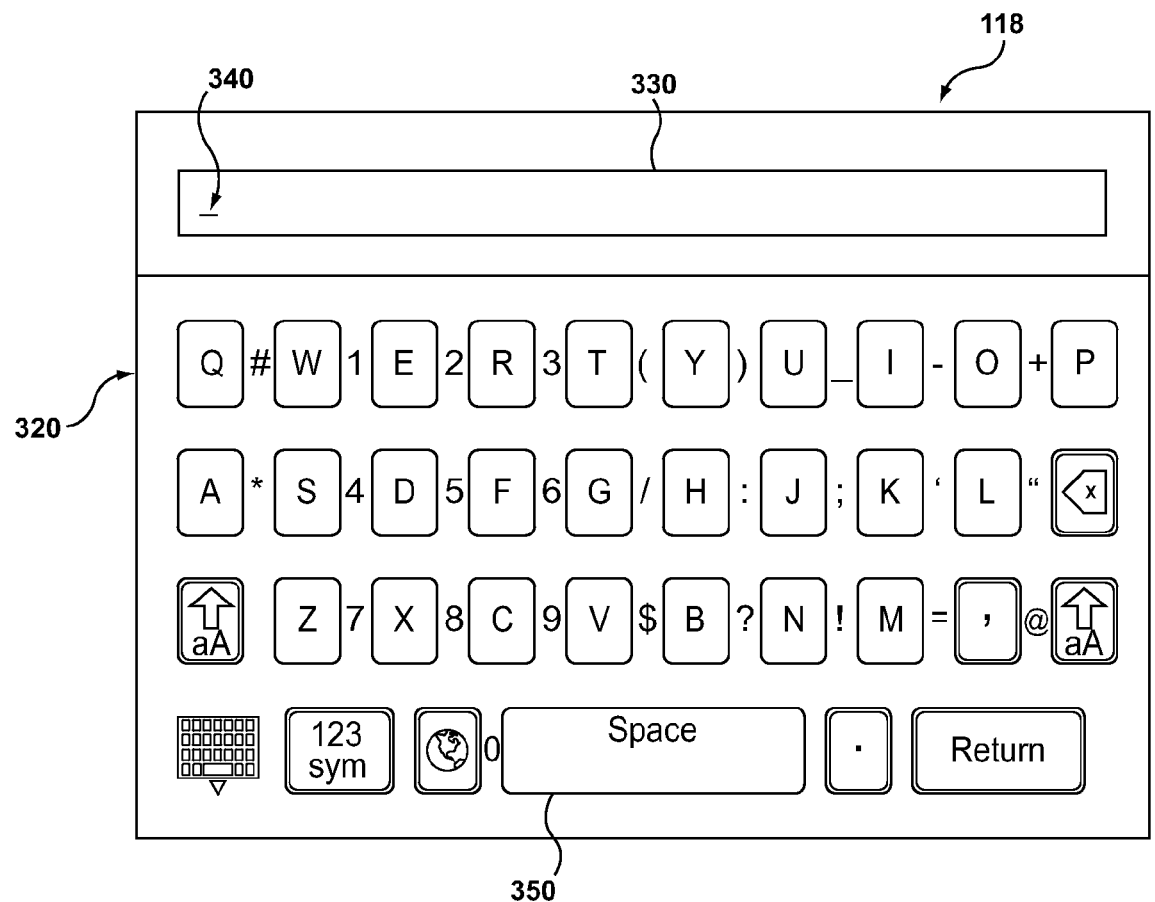
FIGS. 3A, 3B, 3C, and 3D show example front views of a touchscreen, consistent with embodiments disclosed herein.

As shown in FIG. 3A, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touchscreen 118 displays input field 330, which displays the characters the user inputs using virtual keyboard 320. Input field 330 includes a cursor 340, which can be an underscore (as shown) or any other shape, such as a vertical line. Cursor 340 represents the character space where a next inputted character, selected character, or selected set of characters will be inserted.

Figure 3B:
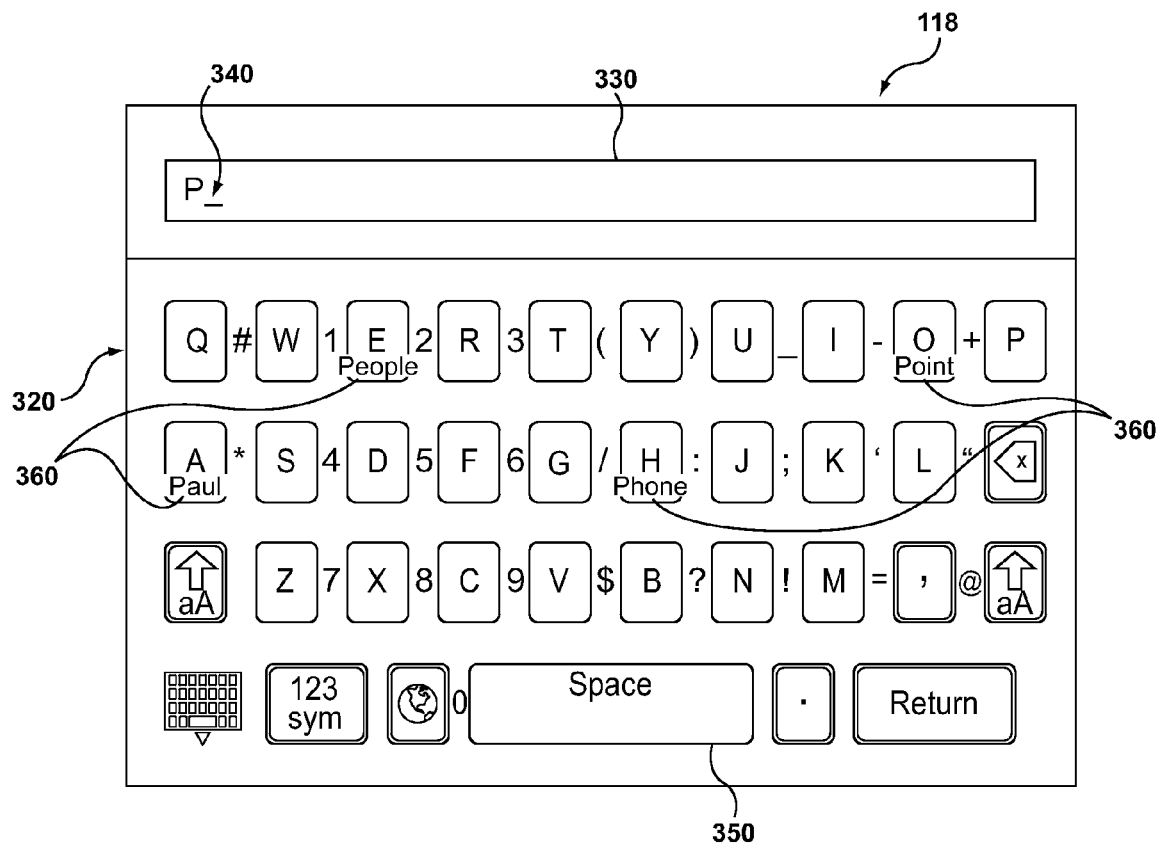

As shown in FIG. 3B, when a user inputs a character (in this example, "P"), this character is displayed in input field 330 and cursor 340 moves to the character space where the next inputted character or word will be inserted. After the character is inputted, a predictor (such as, a predictive algorithm or a circuit) can generate set of characters 360 (for this embodiment) that all begin with the character "P", or characters if more than one character is input. The generated set of characters are displayed at a location on the keyboard corresponding to a subsequent candidate input character that might be received as input from the user. As mentioned, generated set of characters 360 can be displayed at or near the key corresponding to the subsequent candidate input characters (for example, under the respective A, E, H, and O keys of the virtual keyboard 320). Indeed, slightly shifting the display location of the generated set of characters can address overcrowding of subsequent candidate input characters, effectively permitting more set of characters to be displayed.

In the example shown in FIG. 3B, "P" is received as input and a predictor generates several set of characters 360, which are displayed at keys corresponding to each generated set of characters' subsequent candidate input character. As shown in FIG. 3B, "People" is placed at the "E" key because the next letter after "P" of "People" is "E"; "Paul" will be place at the "A" key because the next letter after "P" of "Paul" is "A"; "Phone" will be placed at the "H" key because the next letter after "P" of "Phone" is "H"; and so on. It should be noted that any of the letters in the set of characters can be upper case or lower case.

Figure 3C:
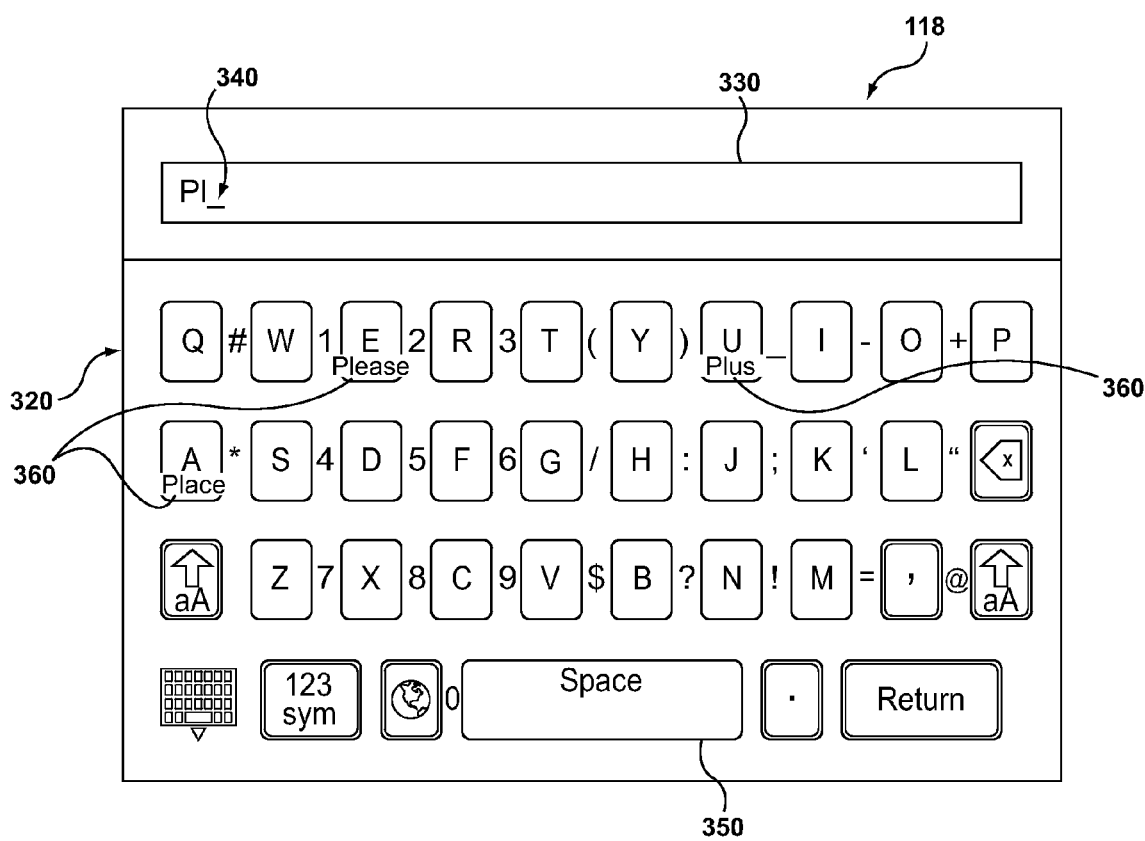

In the embodiment shown in FIG. 3C, "L" is next input received by touchscreen, and a predictor determines several generated set of characters 360, which are displayed at a key corresponding to subsequent candidate input characters (for example, under the respective A, E, and U keys of the virtual keyboard 320), for the current position of cursor 340, which is in the third character position, as shown in input field 330. In another embodiment, a generated set of characters 360 can be presented such as to include the subsequent candidate input character. For example, the set of characters "Please" can be displayed so that the characters "Pl" are displayed before the "E" character on the "E" key, and the characters "ase" can be placed after the "E" character on the "E" key. Further, in this or other embodiments, the displayed "E" can be presented in a manner that differs from the "Pl" and "ase", thereby enabling the user to still recognize it as the "E" key while also making it readily visible so that the user can either input the generated set of characters "Please" or input the character "E". The "E" can be capitalized or in lowercase. In other embodiments, an affix can be displayed at the key. Using the example of the set of characters "Please" above, the "ase" could be displayed at the "E" key so the set of characters fragment "-ease" or "-Ease" would appear.

If the user inputs a generated set of characters, that set of characters is placed in input field 330. This can be seen in FIG. 3D, where the user has inputted generated set of characters "Please," resulting in its placement in the input field. A space is inserted after the set of characters if the user wants to input a new set of characters. A user could input a generated set of characters in various ways, including in a way that differs from a manner of inputting a character key. For example, to input a generated set of characters, a user could use a finger or stylus to swipe the generated set of characters. As used herein, swiping includes swiping the set of characters itself or swiping or touching near the set of characters. For the latter embodiment, the device can detect a swipe or touch near a set of characters, be it a generated set of characters or a predicted set of characters (to be described below), and through the use of a predictor, determine the set of characters the user intended to input. In another embodiment, the user could press a key for a predetermined period of time, such as a long press. That key can be, for example, the key corresponding to the subsequent candidate input character of the set of characters. So, if the set of characters "Please" is intended to be inputted instead of "E", the electronic device 100 can be configured to require that the "E" key be pressed for a predetermined period of time to trigger the input of "Please".

Figure 3D:
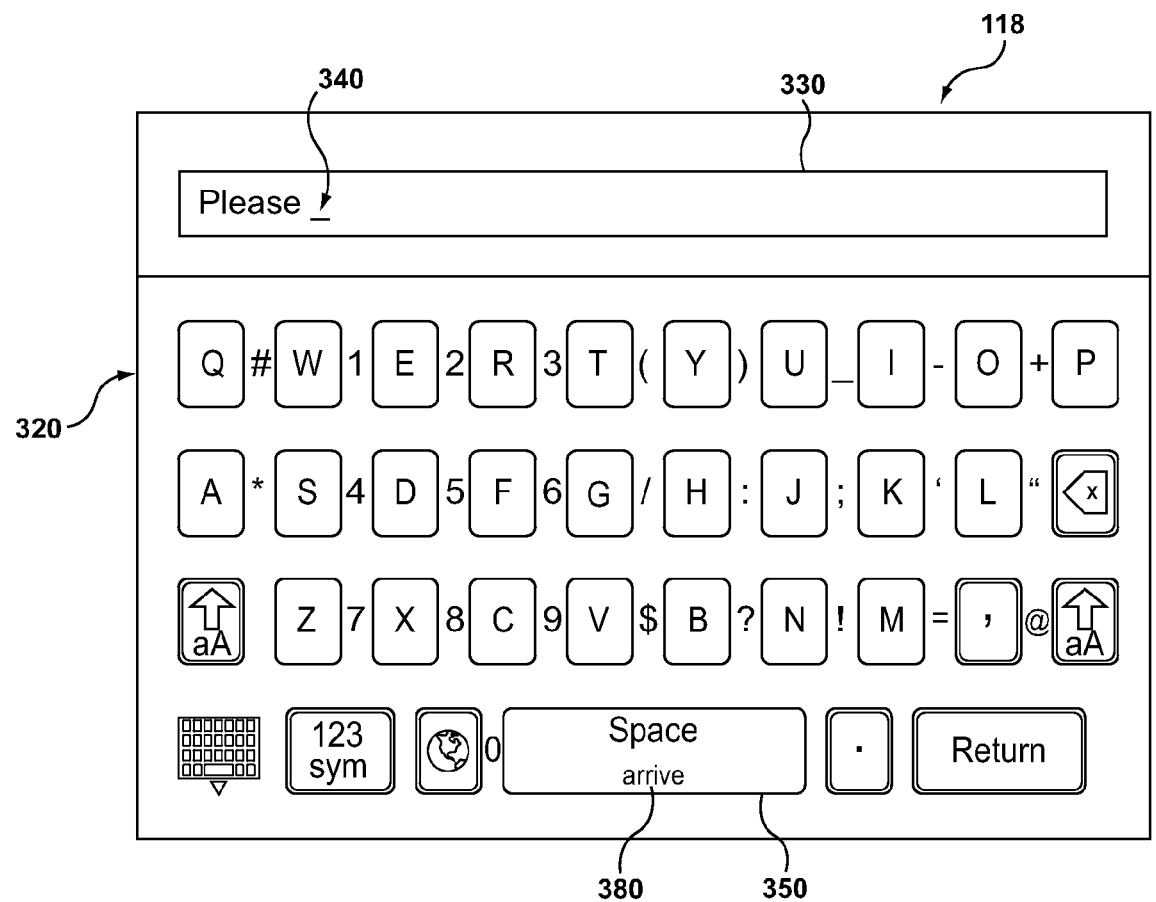

After a generated set of characters 360 has been determined, as shown in FIG. 3D, a predicted set of characters 380 can be displayed, shown here at space key 350. Predicted set of characters 380 can differ from generated set of characters 360 (as shown in FIGS. 3A-3C) and is the system's attempt to predict the next set of characters a user might be contemplating. A predictor is used to determine predicted set of characters 380. As with displayed generated set of characters 360, predicted set of characters 380 can be received as input in any number of ways, including receiving a swiping of the predicted set of characters with a finger or stylus or receiving a pressing of a key (such as the space key or another designated key) for a predetermined period of time (long press).

Figure 4A:
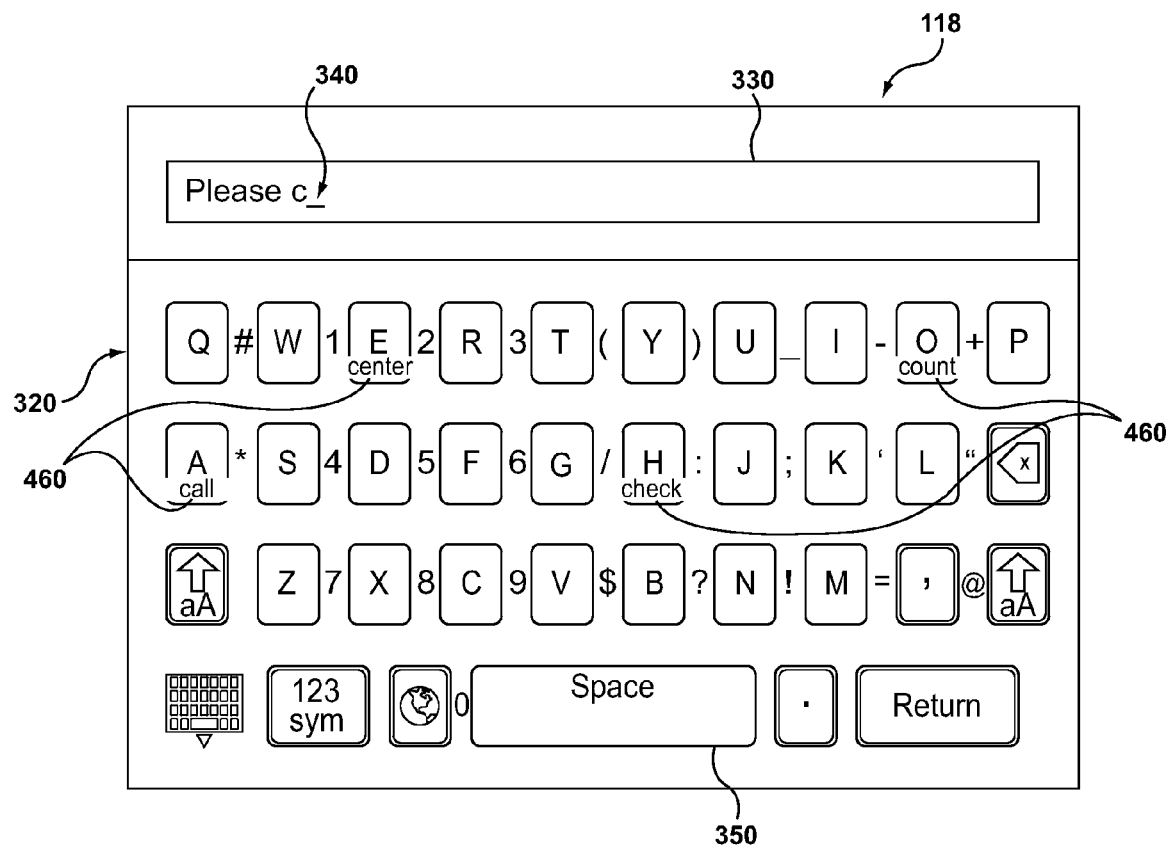
FIGS. 4A and 4B show example front views of a touchscreen, consistent with embodiments disclosed herein.
Figure 4B:
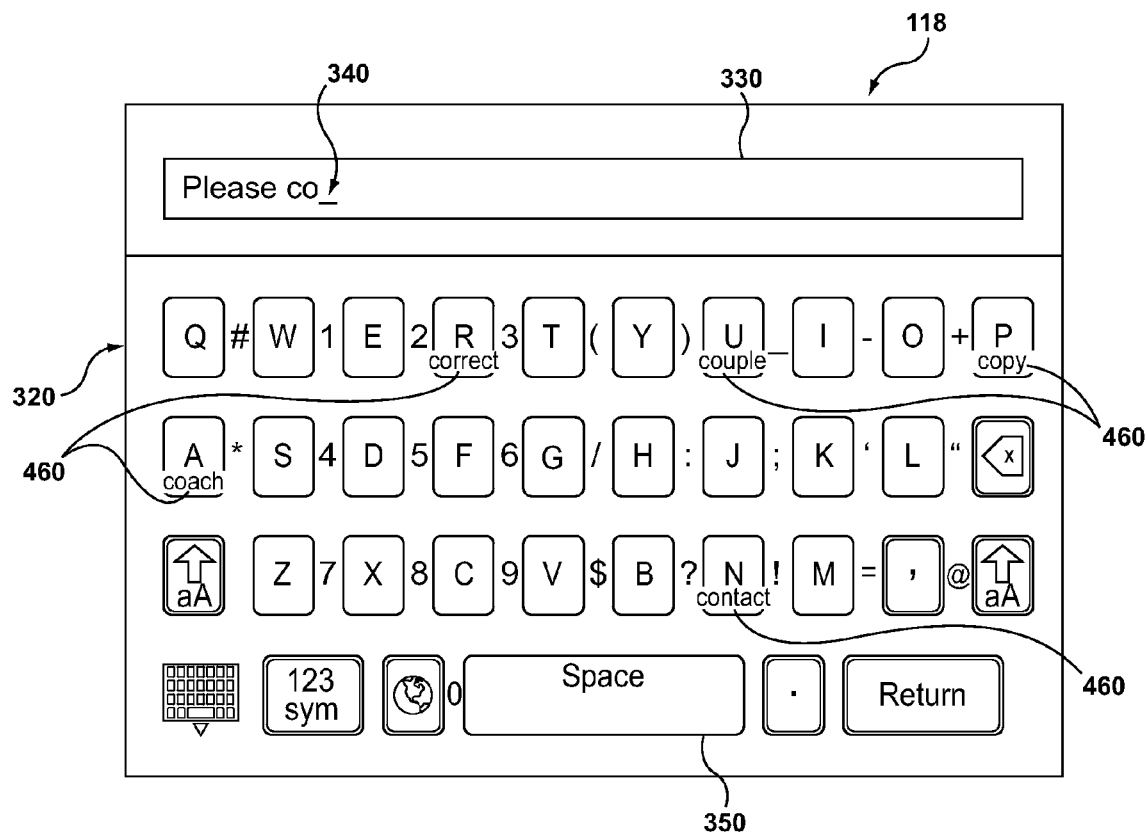

In FIG. 4A, electronic device 100 receives "C" as input from virtual keyboard 320. Again, a predictor determines generated set of characters 460 based in part on the received input. In FIG. 4B, electronic device 100 receives "O" as input from the virtual keyboard and outputs the "O" in input field 330. As shown in FIG. 4A, the set of characters "count" was displayed at the "O" key after the input of the "C" character was received. Since the "O" key was pressed in a manner to only input the "O" character, as shown in FIG. 4B, an "O" is displayed as second character of the currently inputted set of characters, and the set of characters "count" is not inputted by the user. Alternatively, if a user wanted to input the generated set of characters "count," the user can input the "O" key in FIG. 4A in a manner different from a manner of inputting the "O" key, such as by swiping the set of characters "count" or by a long press on the "O" key, as opposed to tapping. Returning to FIG. 4B, after the "O" is inputted, generated set of characters 460 are displayed at the keys corresponding to subsequent candidate input characters, as shown in FIG. 4B.

Figure 5:
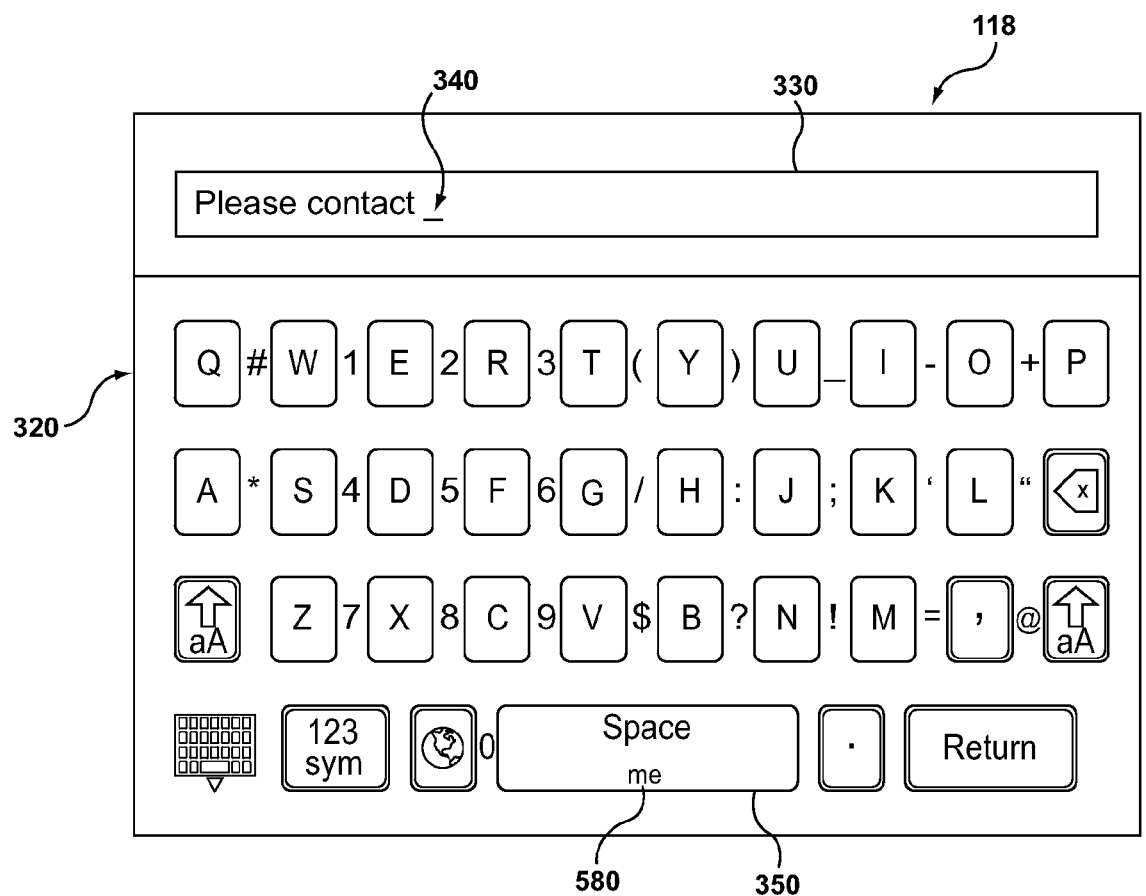
FIG. 5 shows an example front view of a touchscreen, consistent with embodiments disclosed herein.

FIG. 5 shows input field 330 displaying the set of characters "contact" followed by a space. In that instance, the user inputted the generated set of characters "contact" 460 as was shown in FIG. 4B at the "N" key. Referring back to FIG. 5, a <SPACE> character is now automatically inserted after the generated word in the input field. Predicted word "me" 580 is now displayed on space key 350.

Figure 6A:
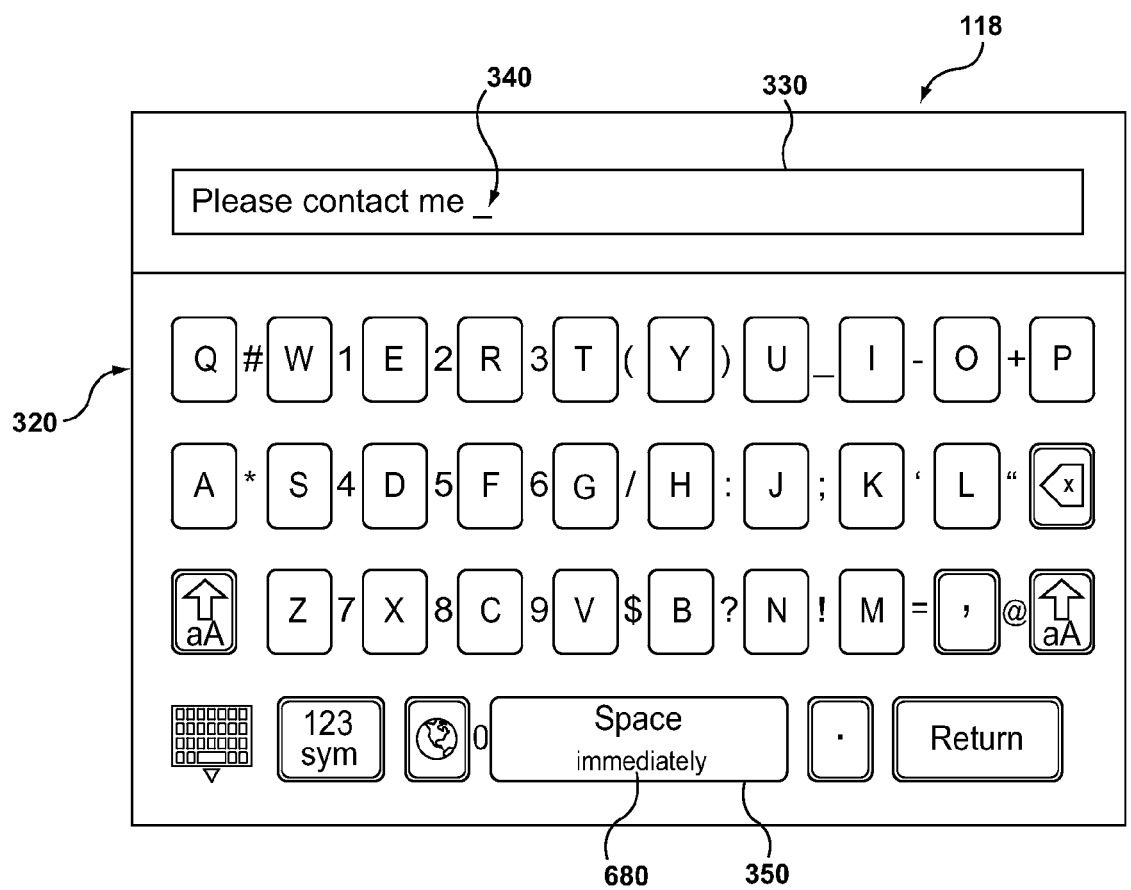
FIGS. 6A, 6B, and 6C show example front views of a touchscreen, consistent with embodiments disclosed herein.

If the predicted word "me" 580 is received as input, the word "me" 580 is then displayed in input field 330 followed by a space as shown in FIG. 6A, which then shows predicted word 680 "immediately" displayed on space key 350. The predicted word is presented after a completed word and space have been displayed in input field 330.

Figure 6B:
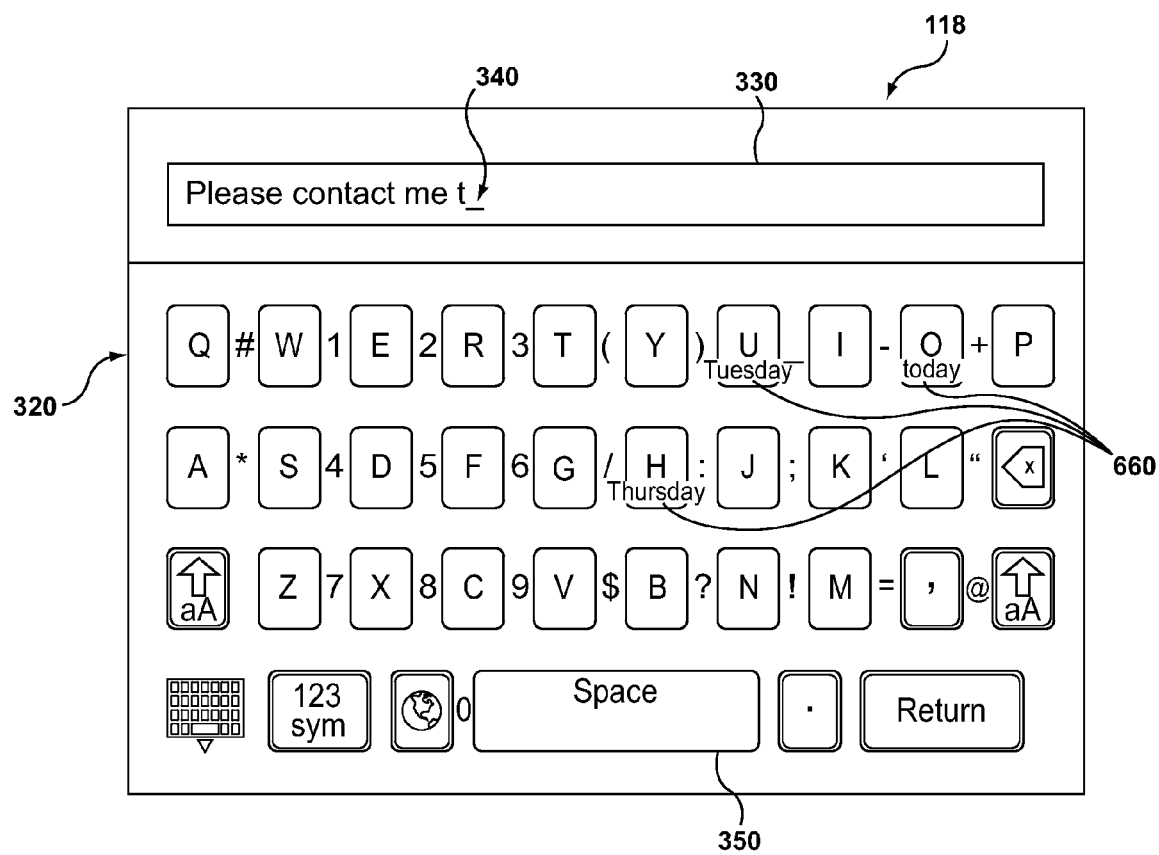
Figure 6C:
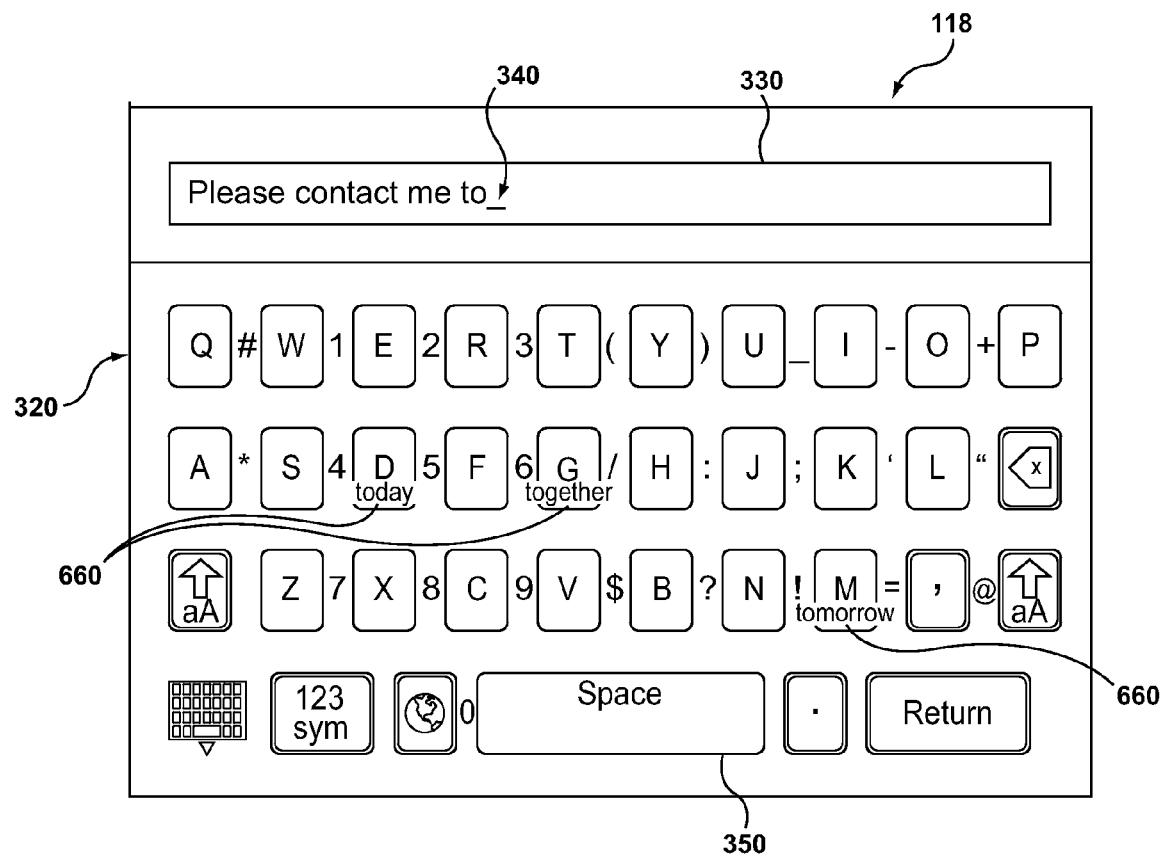

FIG. 6B shows an example where touchscreen 118 has received the "T" character as input after the user has pressed the "T" key. In this scenario, touchscreen 118 displays a "t" in input field 330. Generated set of characters 660 (for example, "Tuesday," "today," and "Thursday") are displayed at the keys of the subsequent candidate input characters. FIG. 6C shows an example where electronic device 100 has received the "o" character as input after the user presses the "O" key instead of inputting generated set of characters 660 "today" as was shown in FIG. 6B. Thus, "o" is now displayed in input field 330.

Figure 7:
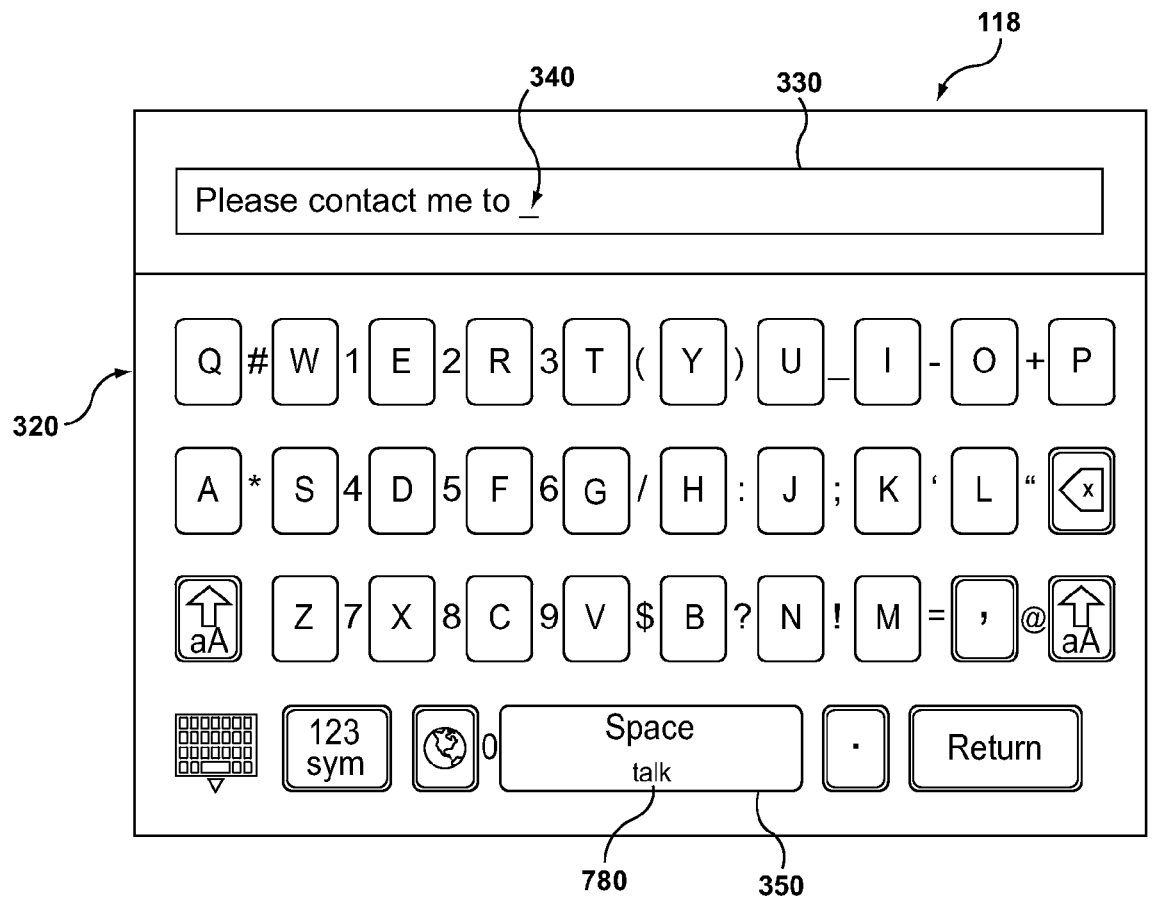
FIG. 7 shows an example front view of a touchscreen, consistent with embodiments disclosed herein.

FIG. 7 shows an example where touchscreen 118 has received the <SPACE> character as input after the user selects the space key. In this scenario, touchscreen 118 inserts a <SPACE> character, and then displays predicted set of characters "talk" 780 at space key 350.

Figure 8A:
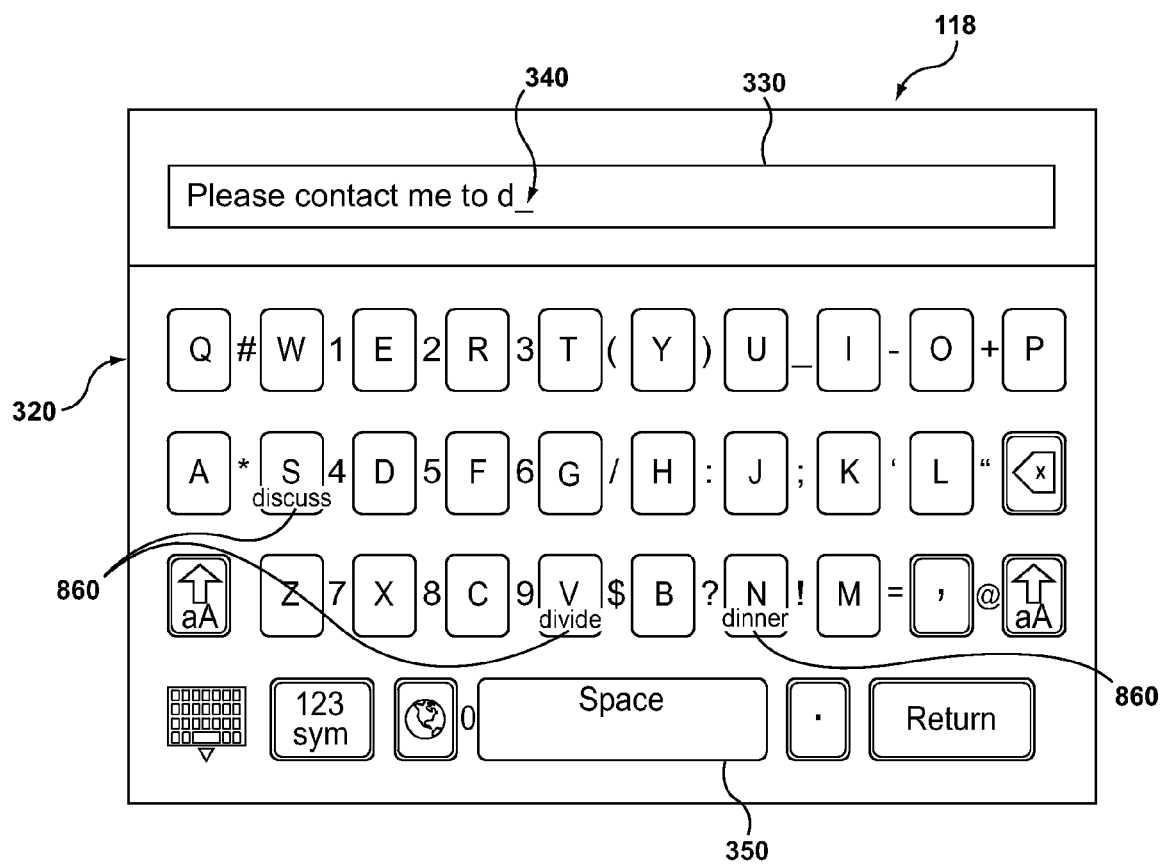
FIGS. 8A and 8B show example front views of a touchscreen, consistent with embodiments disclosed herein.

FIG. 8A shows an example where touchscreen 118 has received the "d" character as input after the user presses the "D" key. In this scenario, touchscreen 118 displays a "d" in the input field 330 and displays generated set of characters "discuss," "divide," and "dinner" 860 on keys corresponding to subsequent candidate input characters. In this example embodiment, while the character "I" was never received as input, electronic device 100 determined that generated set of characters "discuss," "divide," and "dinner" 860 were the set of characters to be displayed on touchscreen. In this embodiment, because each of these set of characters has "i" as its second letter, touchscreen 118 displayed generated set of characters using a further subsequent letter in the set of characters (for example, "discuss" under the "S" key, "divide" under the "V" key, and "dinner" under the "N" key). In other embodiments, generated set of characters "discuss," "divide," and "dinner" 860 can be displayed at or near the "I" key.

Figure 8B:
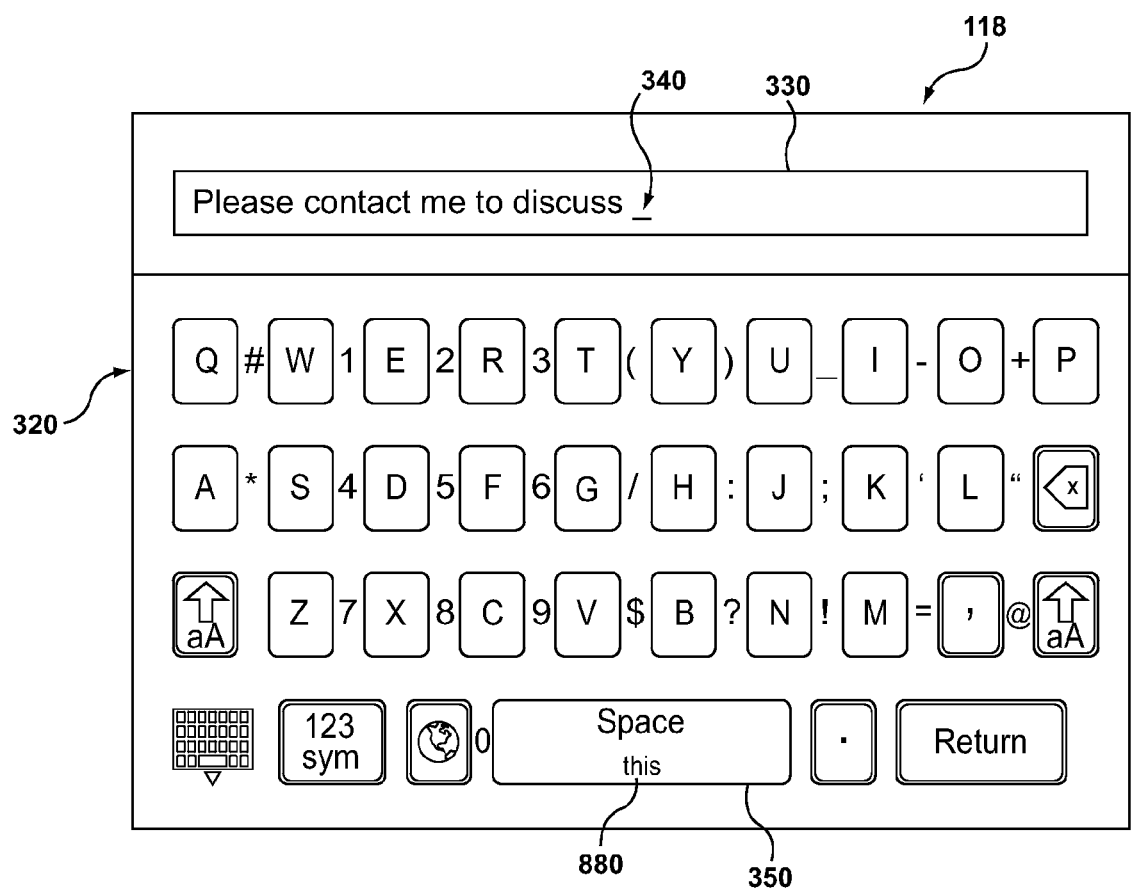

FIG. 8B shows an example where touchscreen 118 has received the set of characters "discuss" as input after the user chooses generated set of characters "discuss" 860. In this example, touchscreen 118 displays predicted set of characters "this" 880 at space key 350.

Figure 9:
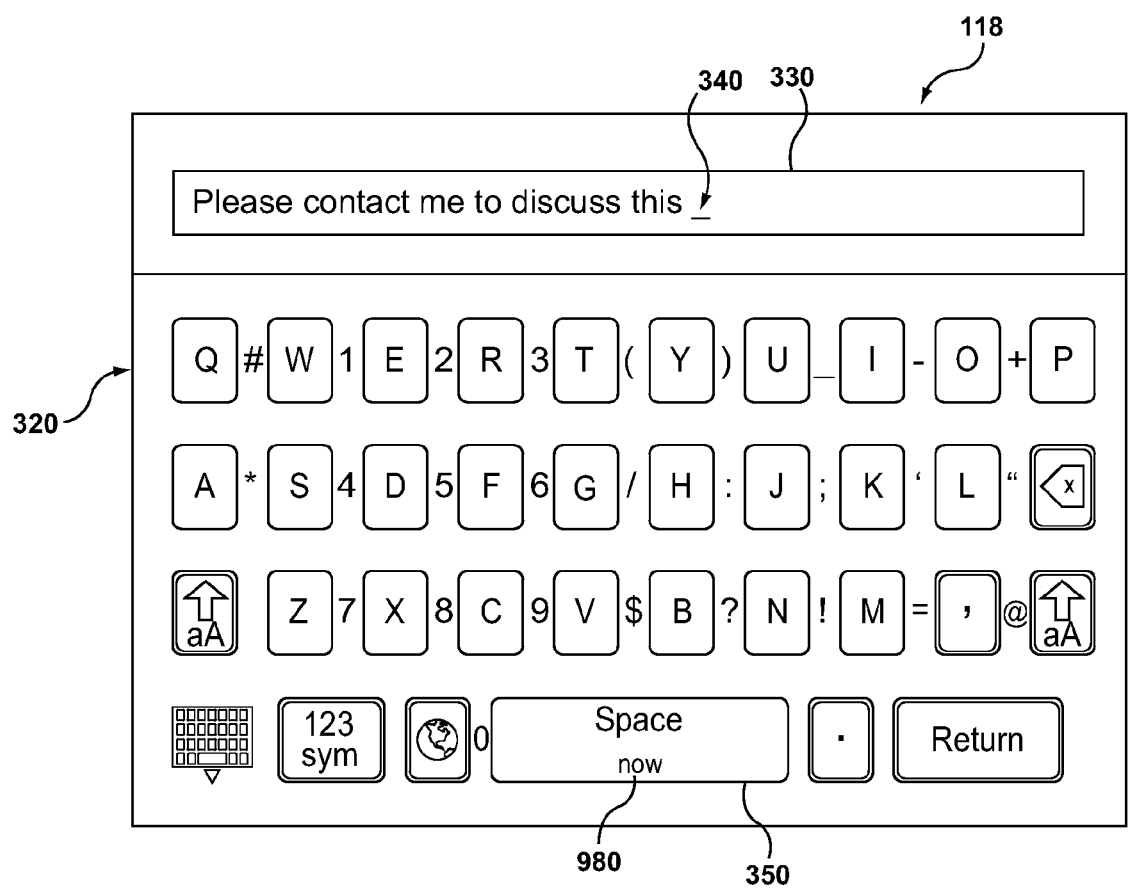
FIG. 9 shows an example front view of a touchscreen, consistent with embodiments disclosed herein.

FIG. 9 shows an example where touchscreen 118 receives the "this" set of characters as input after user selects "this" as a desired predicted set of characters 880. In this example, touchscreen 118 displays predicted set of characters "now" 980 at space key 350.

Touchscreen 118 can also receive punctuation as input at any time during the typing of a message. If a user decides to use punctuation after inputting either a generated set of characters or a predicted set of characters, the <SPACE> character (for example, the <SPACE> character prior to cursor 940 of FIG. 9) is deleted and the inputted punctuation is inserted.

Figure 10A:
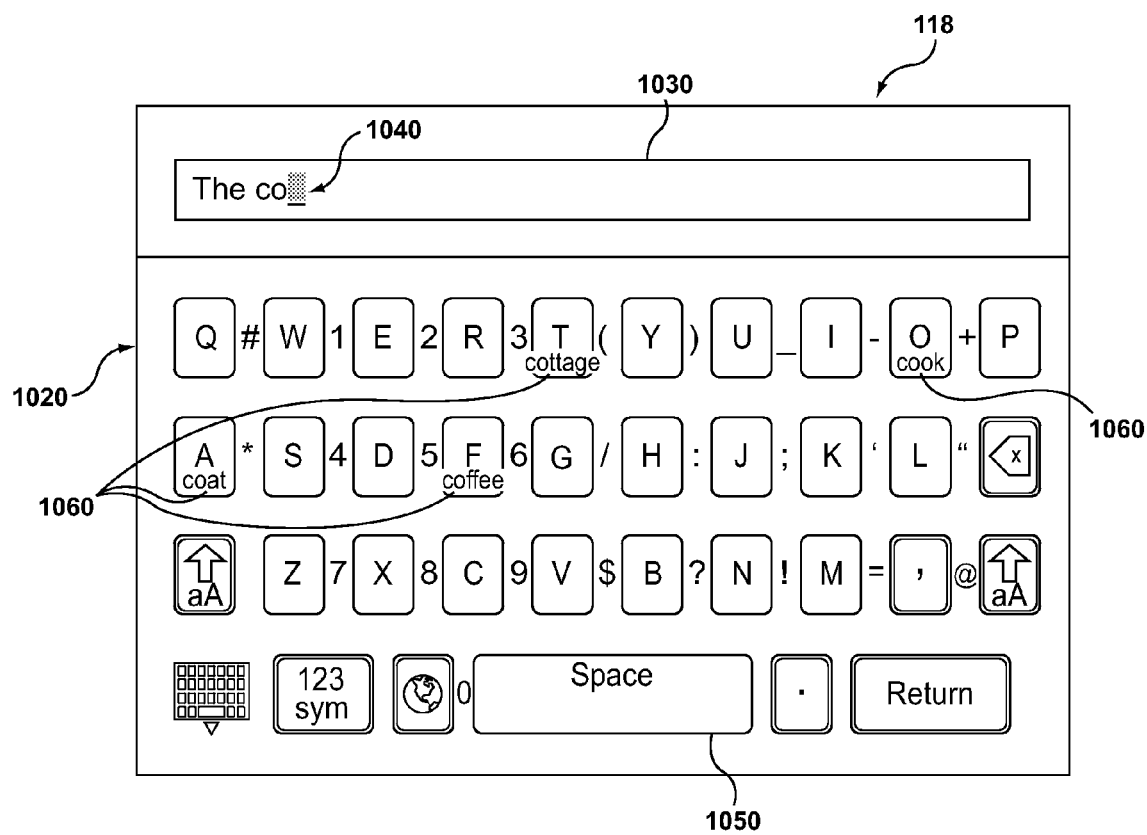
FIGS. 10A and 10B show example front views of a touchscreen, consistent with embodiments disclosed herein.
Figure 10B:
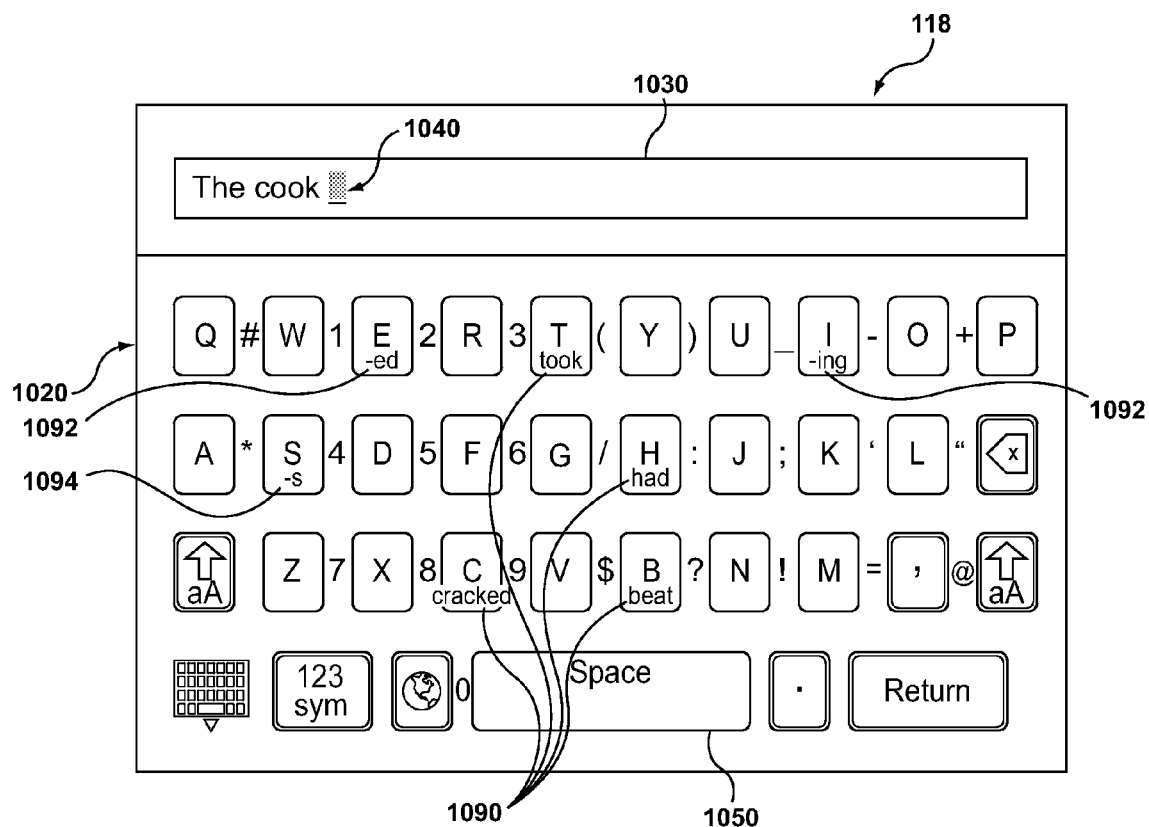

FIGS. 10A and 10B show example front views of a touchscreen, consistent with embodiments disclosed herein. FIG. 10A shows an example where touchscreen 118 displays "The co" in a text bar 1030 and several generated set of characters 1060 are displayed at subsequent candidate input characters. In this example, touchscreen 118 displays generated set of characters "cottage" 1060 under the "T" key, generated set of characters "cook" 1060 under the "O" key, generated set of characters "coat" 1060 under the "A" key, and generated set of characters "coffee" 1060 under the "F" key.

FIG. 10B shows an example where touchscreen 118 receives the set of characters "cook" as input after the user has selected the generated set of characters 1060 "cook." The set of characters "cook" is inserted into input field 1030 along with a <SPACE> character. In this example, set of characters include new predicted set of characters (such as words 1090, affixes 1092 (for example, "-ed" under the "E" key and "-ing" under the "I" key), and plurals 1094 (for example, "-s" under the "S" key)), all of which are displayed at subsequent candidate input characters. Each predicted word 1090, affix 1092, or plural 1094 is located on respective subsequent candidate input characters that match the first letter of the predicted word 1090, affix 1092, or plural 1094. Now the user has the added option of inputting a predicted set of characters 1090, 1092, and 1094. Input is made in the same manner as described above. In some embodiments, when touchscreen 118 receives either affix 1092 or plural 1094 as an input, the <SPACE> character between cursor 1040 and "cook" is deleted and the corresponding inputted affix or plural is added to the end of "cook."

Figure 11A:
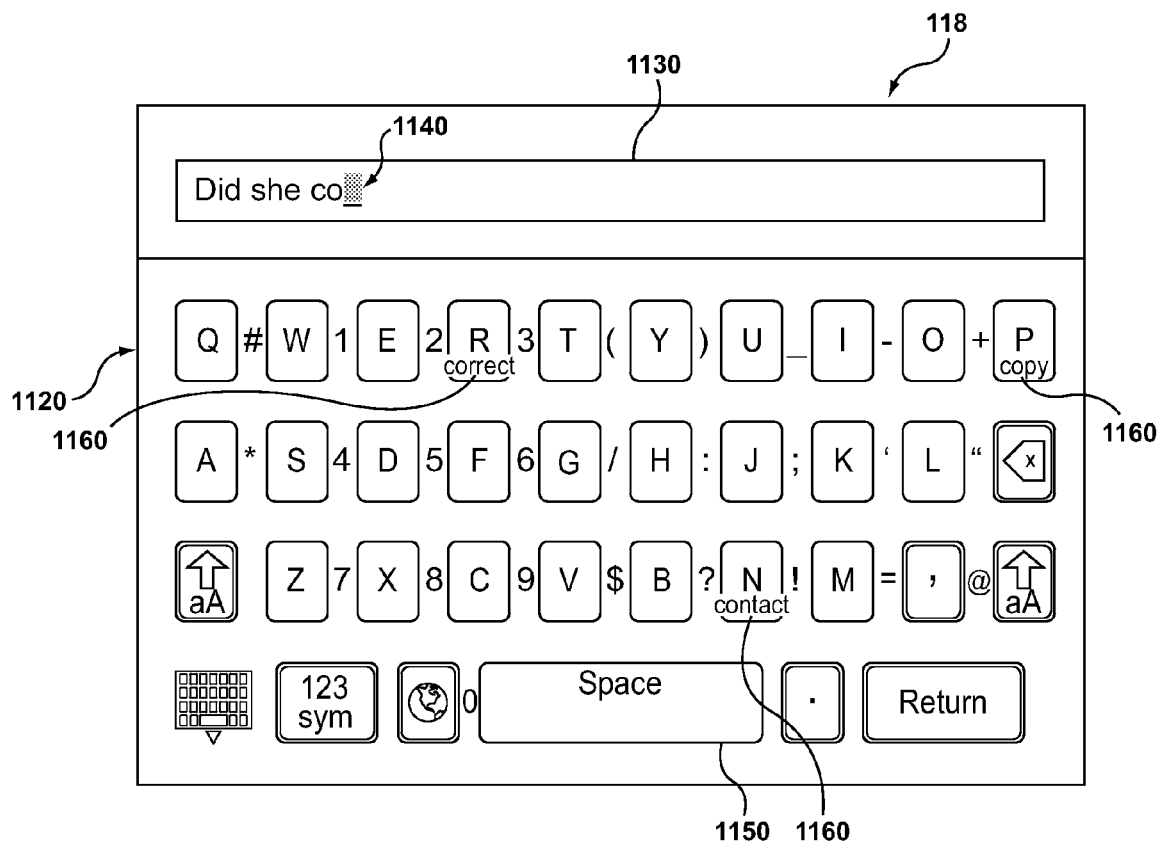
FIGS. 11A and 11B show example front views of a touchscreen, consistent with embodiments disclosed herein.

FIG. 11A shows an example where touchscreen 118 displays "Did she co" in a text bar 1130 and several generated set of characters 1160 are displayed at subsequent candidate input characters. In this example, touchscreen 118 displays generated set of characters "correct" 1160 under the "R" key, generated set of characters "copy" 1160 under the "P" key, and generated set of characters "contact" 1160 under the "N" key. While "co" is provided in the text bars of both FIG. 10A and FIG. 11A, touchscreen displays different generated set of characters based on the context of the characters in their respective text bars 1030 and 1130. For example, in FIG. 10A, the characters "co" follows "The," which implies that a noun beginning with "co" should follow. In FIG. 11A, the characters "co" follow a pronoun, which implies that a verb beginning with "co" should follow. As stated above, contextual data can be used to determine when certain set of characters are more appropriate based on, for example, the set of characters in a text bar or previous actions by a user.

Figure 11B:
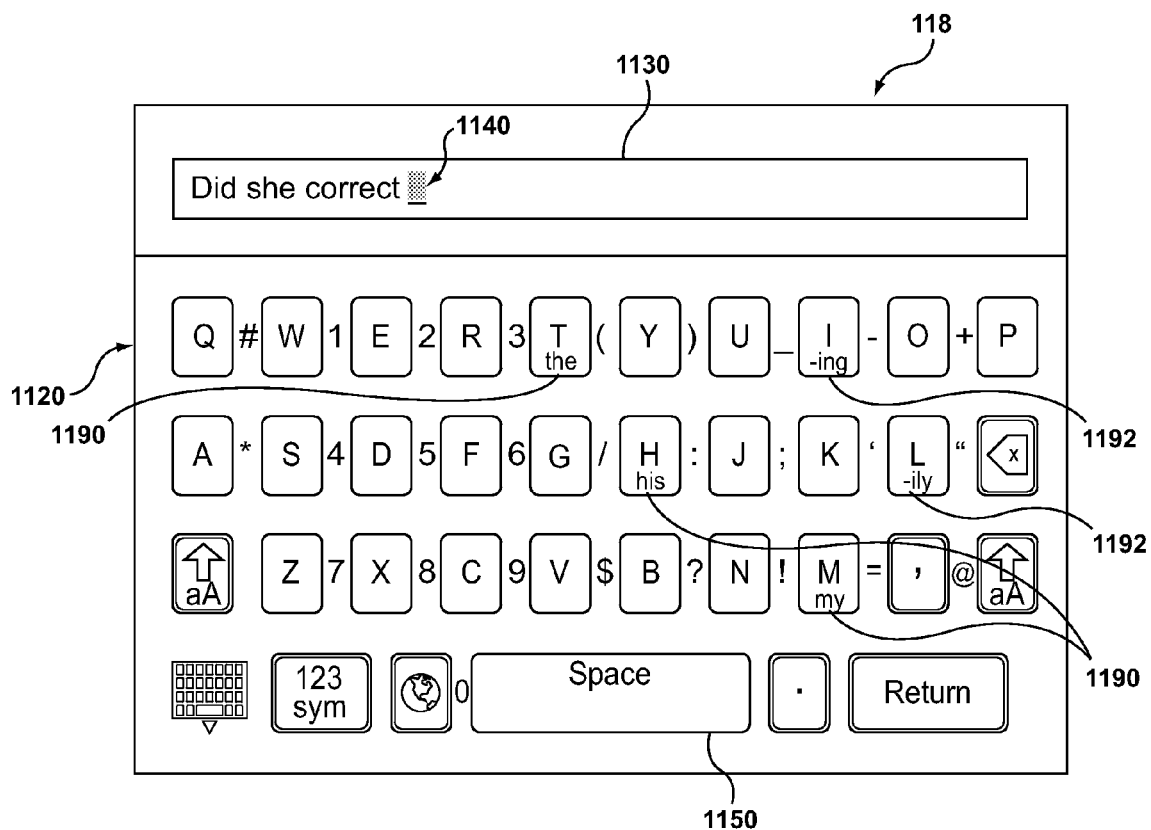

FIG. 11B shows an example where touchscreen 118 receives the set of characters "correct" as input after the user has selected the generated set of characters "correct" 1160. In this example, the set of characters "correct" is inserted in input field 1130 and a <SPACE> character is also inserted. Predicted set of characters (such as words 1190 and affixes 1192) are now displayed at subsequent candidate input characters. In this example, while affixes "-ing" and "-ily" both correspond to the "I" key, touchscreen 118 displays "-ing" with the "I" key and "-ily" with the "L" key. As stated above, the predicted affix may be assigned to a certain key based on a ranking, on contextual data, or a combination of both. In this embodiment, the "-ing" affix may have had a higher ranking than the "-ily" affix and was thus assigned to the "I" key. Accordingly, the "-ily" affix was assigned to the "L" key based on the corresponding "L" character being in the "-ily" affix.

Figure 12A:
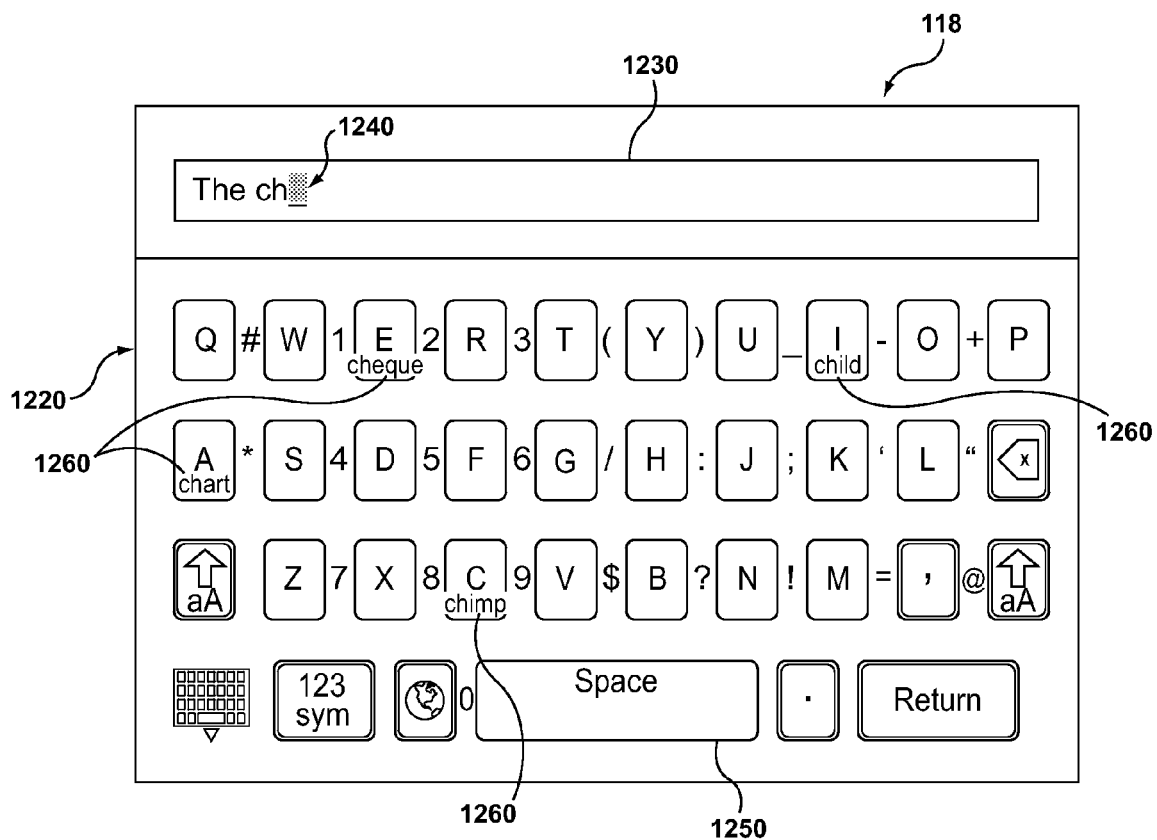
FIGS. 12A and 12B show example front views of a touchscreen, consistent with embodiments disclosed herein.

FIG. 12A shows an example where touchscreen 118 displays "The ch" in a text bar 1230 and several generated set of characters 1260 are displayed at subsequent candidate input characters. In this example, generated set of characters 1260 include both "child" and "chimp." In this embodiment, while the third letter in both "child" and "chimp" are the same, touchscreen displays "child" under the "I" key and displays "chimp" under the "C" key. The determination on which generated set of characters goes under which candidate input key can be based on a ranking (as specified above). As illustrated in this embodiment, touchscreen 118 can display a generated set of characters (in this case, "chimp") on a key even though that key may not be associated with any subsequent characters of the characters in text bar 1230.

Figure 12B:
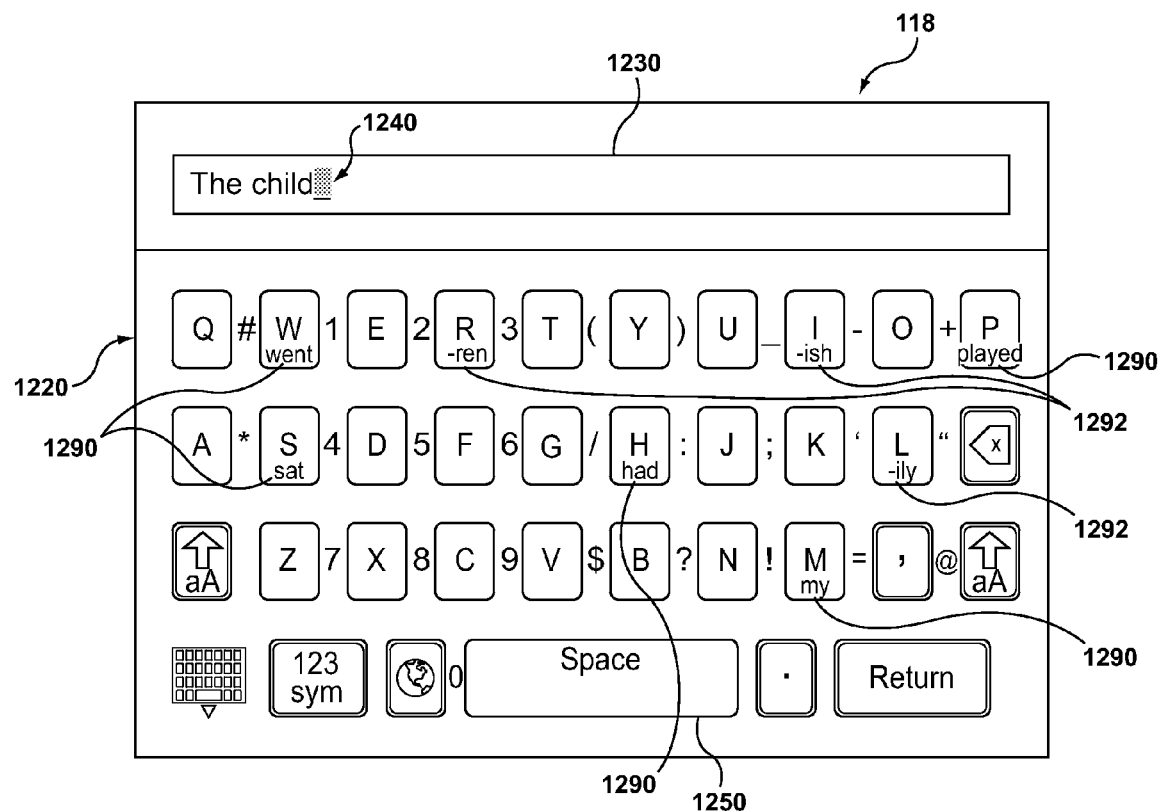

FIG. 12B shows an example where touchscreen 118 receives the set of characters "child" as input after the user has selected the generated set of characters "child" 1260. The set of characters "child" is inserted in input field 1230 and, in this example, a <SPACE> character is not inserted. Predicted set of characters (such as words 1290 and affixes 1292) are now displayed at subsequent candidate input characters. In this example, while affixes "-ish" and "-ily" both correspond to the "I" key, touchscreen 118 displays "-ish" with the "I" key and "-ily" with the "L" key. As stated above, the predicted affix may be assigned to a certain key based on a ranking, on conventional data, or a combination of both. In this embodiment, the "-ish" affix may have had a higher ranking than the "-ily" affix and was thus assigned to the "I" key. Accordingly, the "-ily" affix was assigned to the "L" key based on the corresponding "L" character being in the "-ily" affix.

Figure 13A:
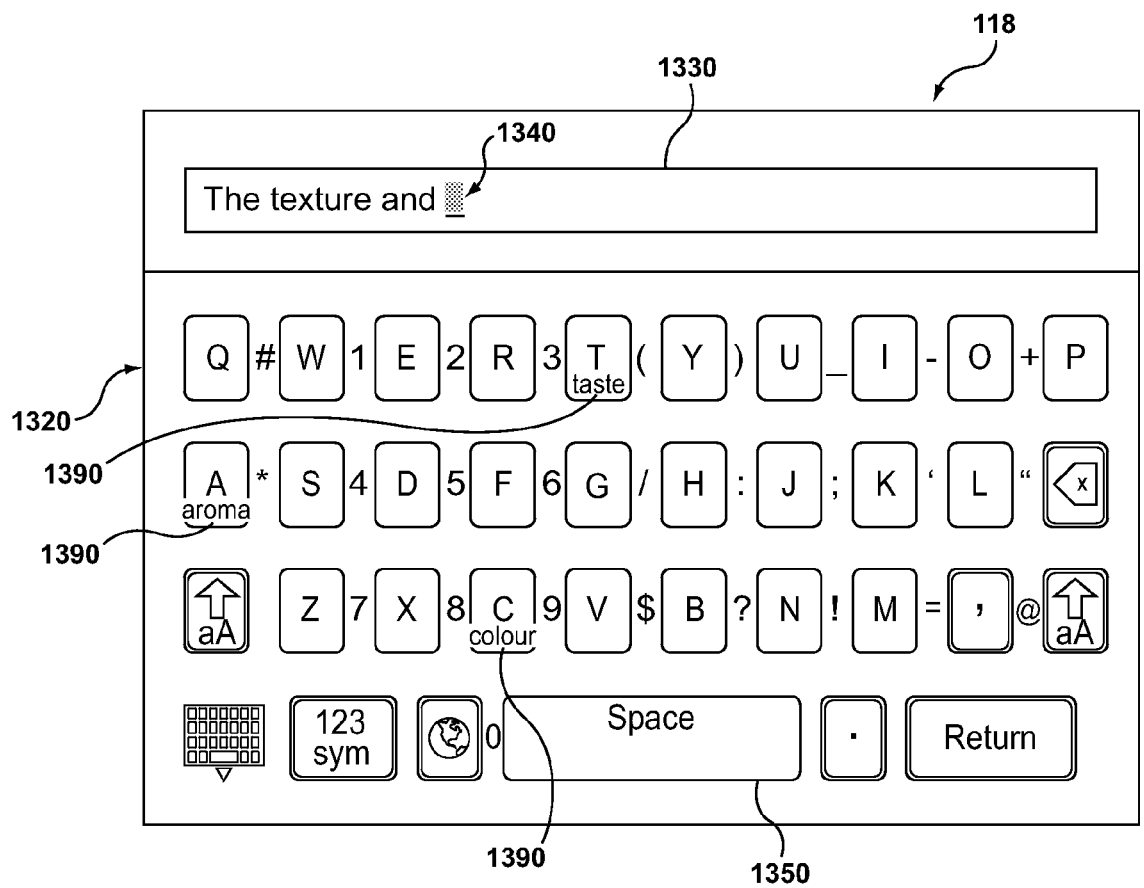
FIGS. 13A and 13B show example front views of a touchscreen, consistent with embodiments disclosed herein.
Figure 13B:
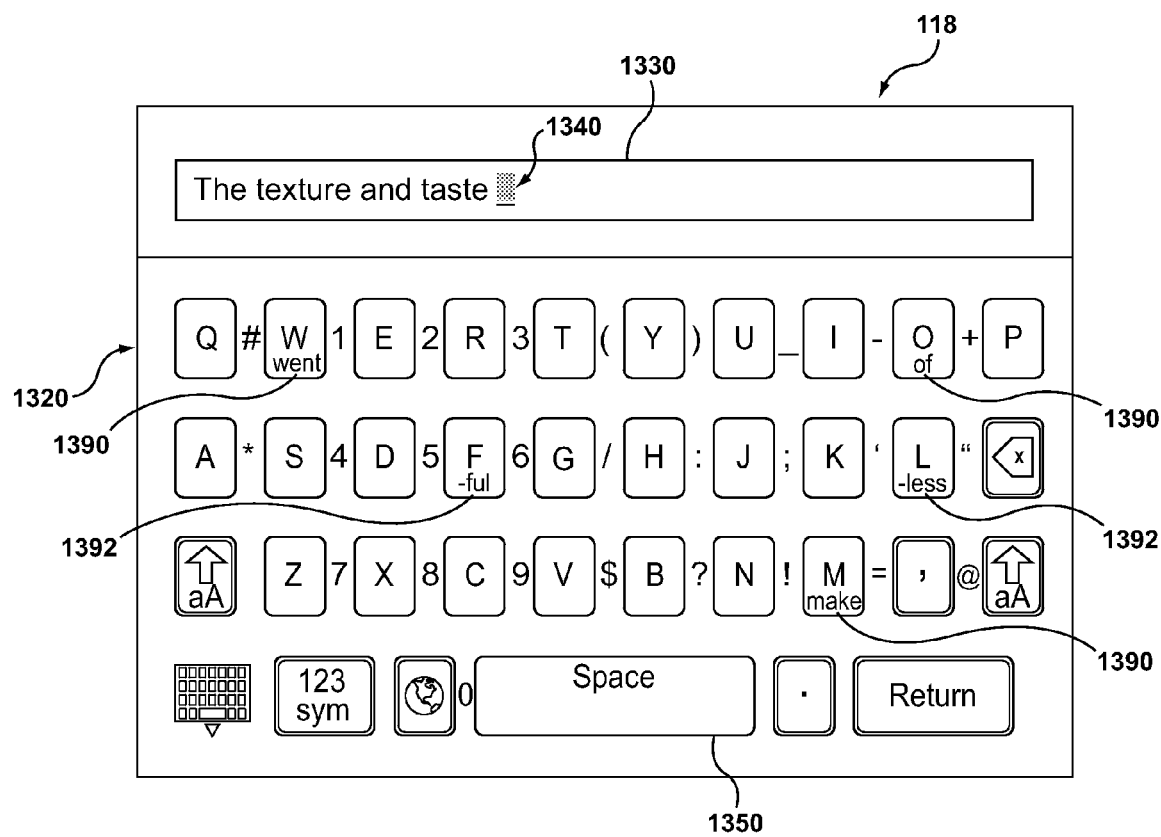

FIG. 13A shows an example where touchscreen 118 displays "The texture and" in a text bar 1330 and several predicted set of characters (for example, words 1390) are displayed at subsequent candidate input characters. FIG. 13B shows an example where touchscreen 118 received the set of characters "taste" as input after the user had selected the predicted set of characters "taste." In this example, a <SPACE> character was inserted after "taste." Consequently, predicted set of characters (such as, words 1390 and affixes 1392) are displayed at subsequent candidate input characters.

Figure 14A:
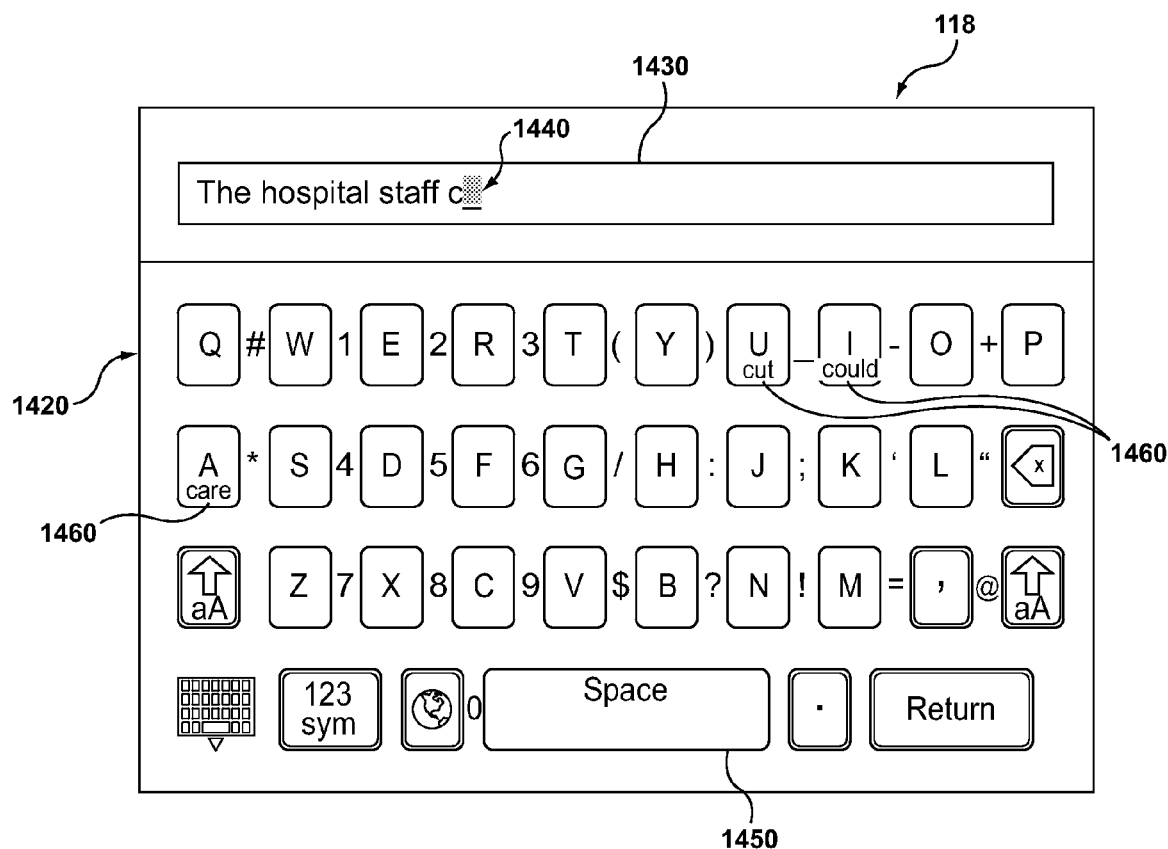
FIGS. 14A, 14B, and 14C show example front views of a touchscreen, consistent with embodiments disclosed herein.
Figure 14B:
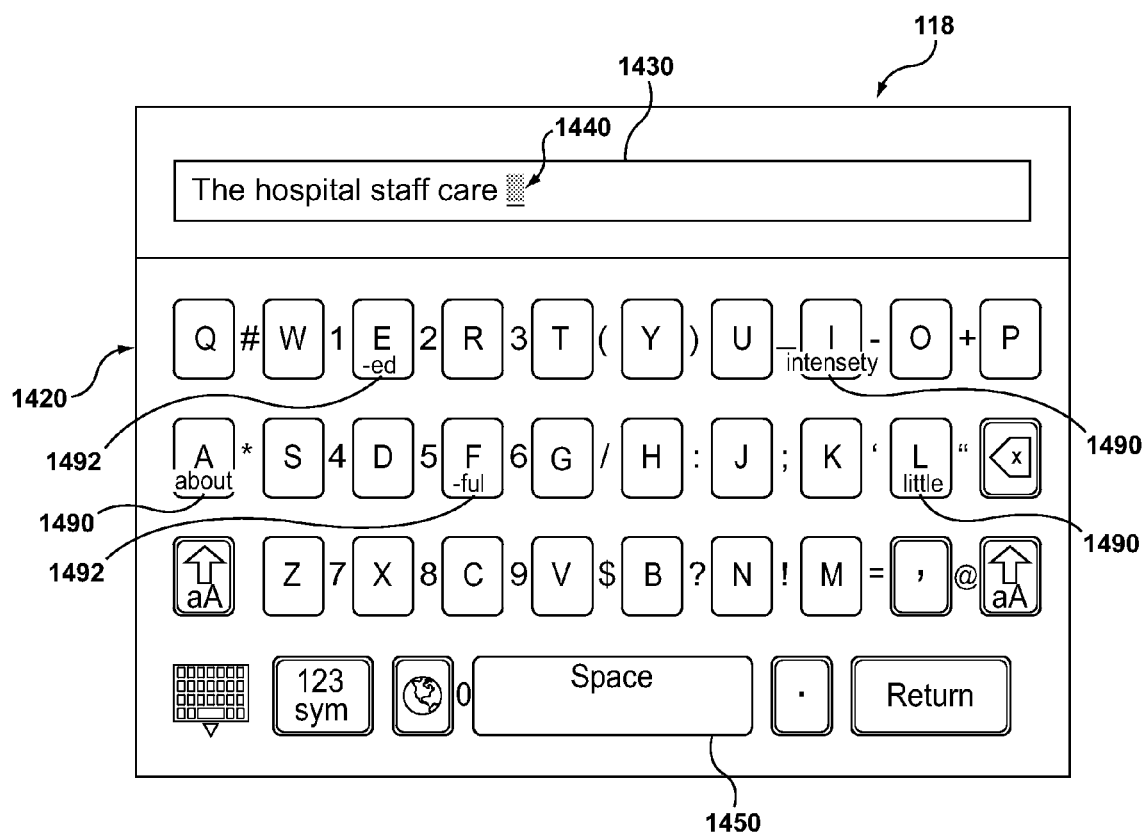
Figure 14C:
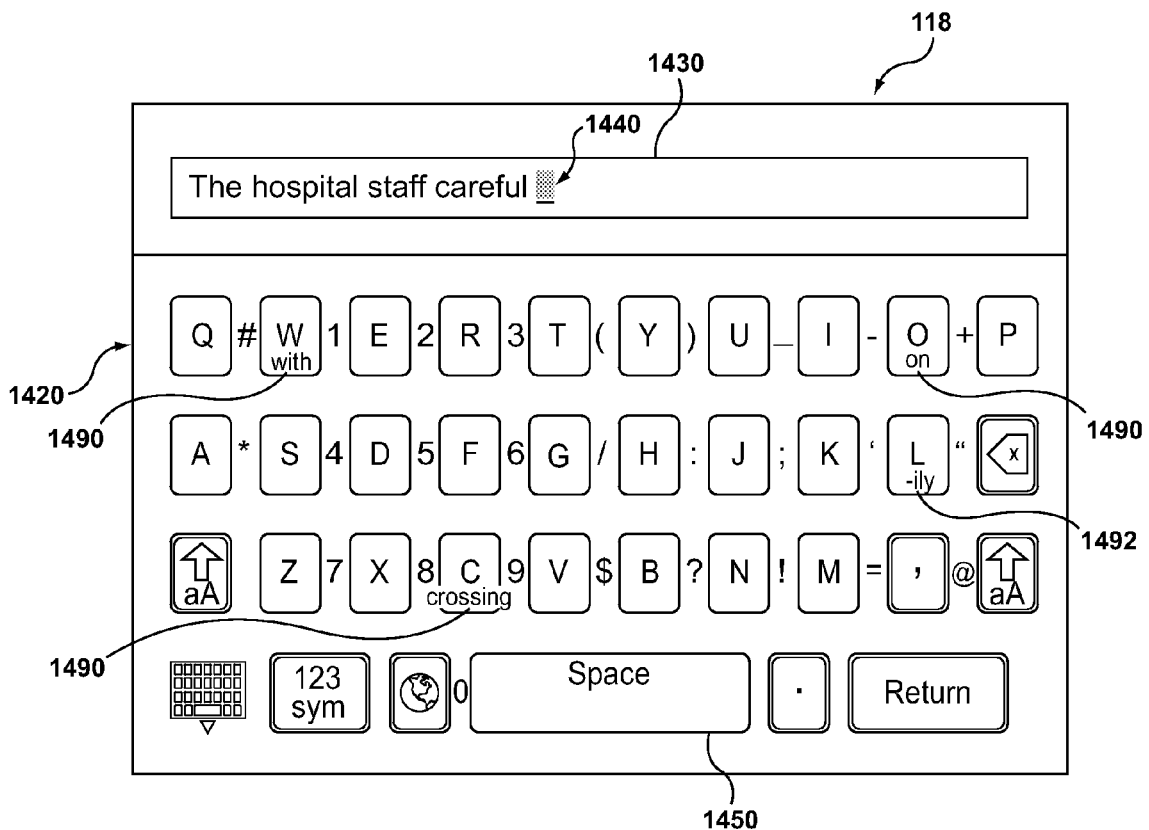

FIG. 14A shows an example where touchscreen 118 displays "The hospital staff c" in a text bar 1430 and several generated set of characters 1460 are displayed at subsequent candidate input characters. FIG. 14B shows an example where touchscreen 118 received the set of characters "care" as input after the user had chosen the generated set of characters "care." Generated set of characters "care" is now placed in input field 1430 along with a <SPACE> and predicted set of characters (such as, words 1490 and affixes 1492) are displayed at subsequent candidate input characters. FIG. 14C shows an example where touchscreen 118 received the affix "-ful" as input (thereby modifying the set of characters "care" to "careful") after the user had chosen the predicted affix "-ful." Thus, the set of characters "careful" is now inserted into input field 1430. Note, in some embodiments, inputting a word or affix can modify the input word or word fragment. For example, if "spicy" was input by a user, and "ness" is a predicted affix and is inputted, "spicy" would change to "spiciness," dropping the "y" and adding "iness". In other embodiments, "happy" could change to "happiness" or "conceive" could change to "conceivable".

Figure 15:
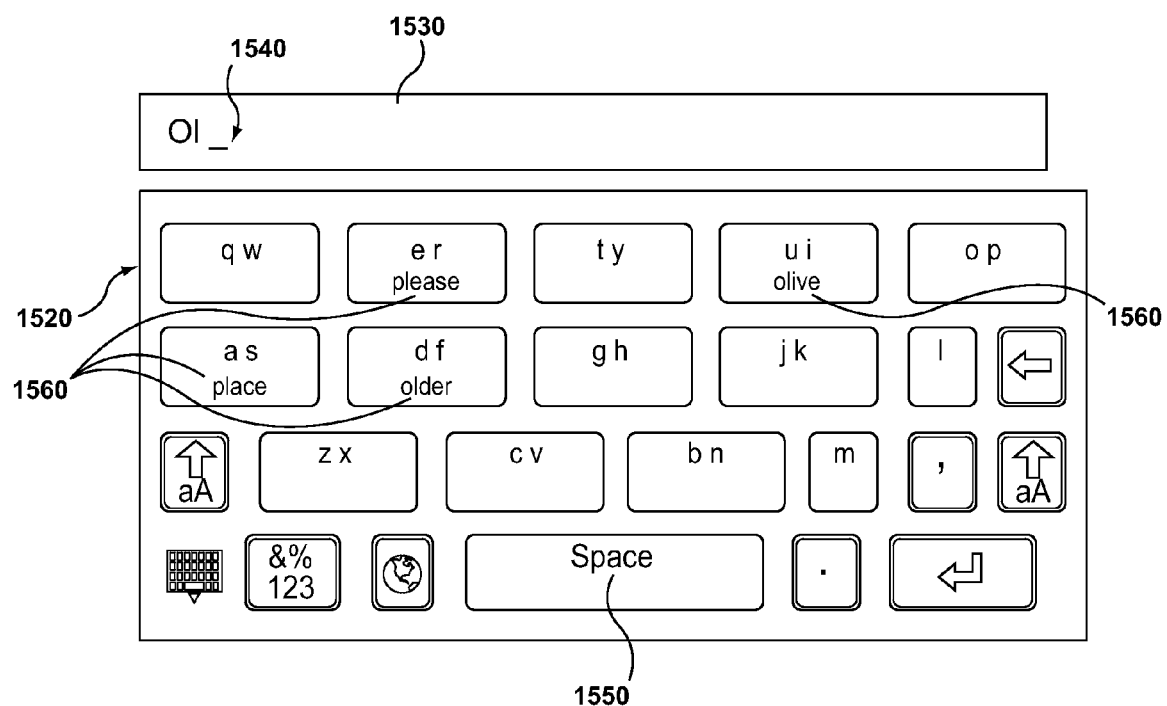
FIG. 15 shows an example front view of a touchscreen, consistent with embodiments disclosed herein.

FIG. 15 shows an example of an ambiguous keyboard 1520, which can have multiple characters assigned to a key (for example, such as a telephone keypad where "A", "B" and "C" are assigned to key 2; "D", "E" and "F" are assigned to key 3, and so on). For example, the characters "Q" and "W" can be assigned one key, and the characters "E" and "R" assigned to another key. In this example, the user has input the characters "01" by pressing the "op" key followed by the "L" key. Using a predictor, generated set of characters 1560 are displayed at subsequent candidate input characters. Since the first pressed key can input either an "O" or a "P" and the second pressed key inputs an "L", generated set of characters 1560 will begin with "OL" or "PL", such as shown by generated set of characters 1560 in FIG. 15.

Figure 16:
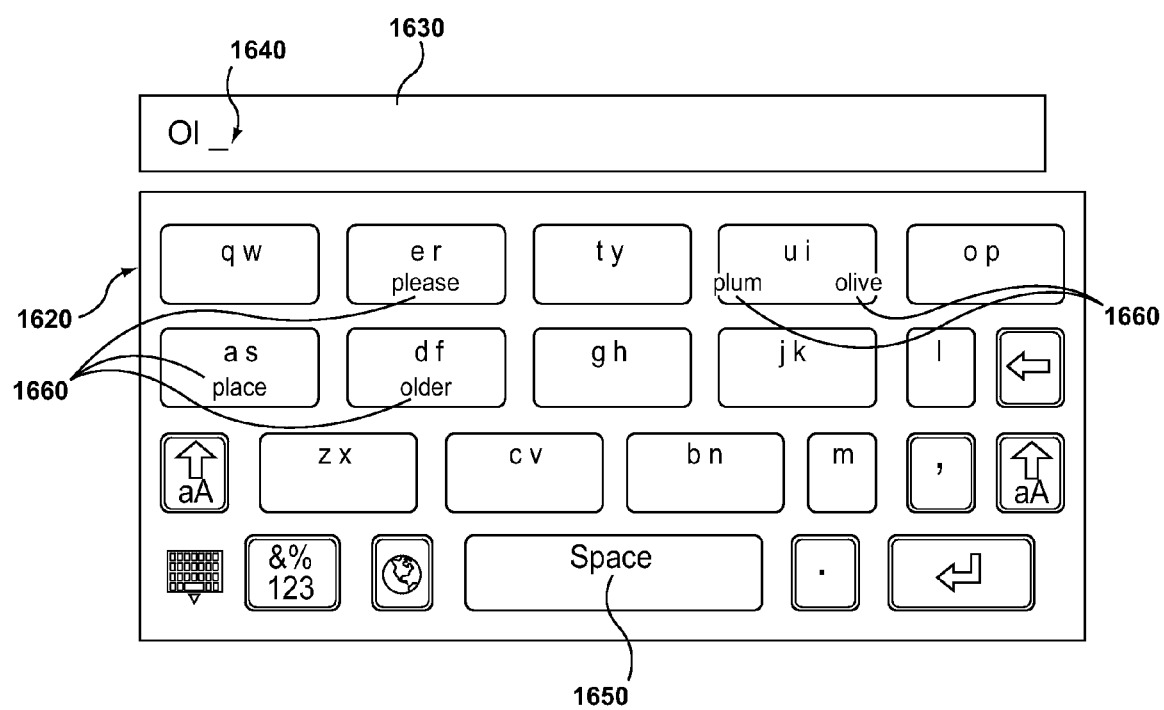
FIG. 16 shows an example front view of a touchscreen, consistent with embodiments disclosed herein.

FIG. 16 shows another example of an ambiguous keyboard 1620. In this example, generated sets of characters "plum" and "olive" 1660 are displayed near the "ui" key. The sets of characters could also have been displayed at or on the "ui" key. Here, both sets of characters correspond to a particular input corresponding to a key, namely the third letter of plum is a "u" and the third letter of olive is an "i." Touchscreen 118 (via main processor 102) can differentiate between the input of either set of characters based on the user's action. For example, the user can swipe at or near the right of the "ui" key to input "olive", or swipe at or near the left of the "ui" key to input "plum".

Figure 17:
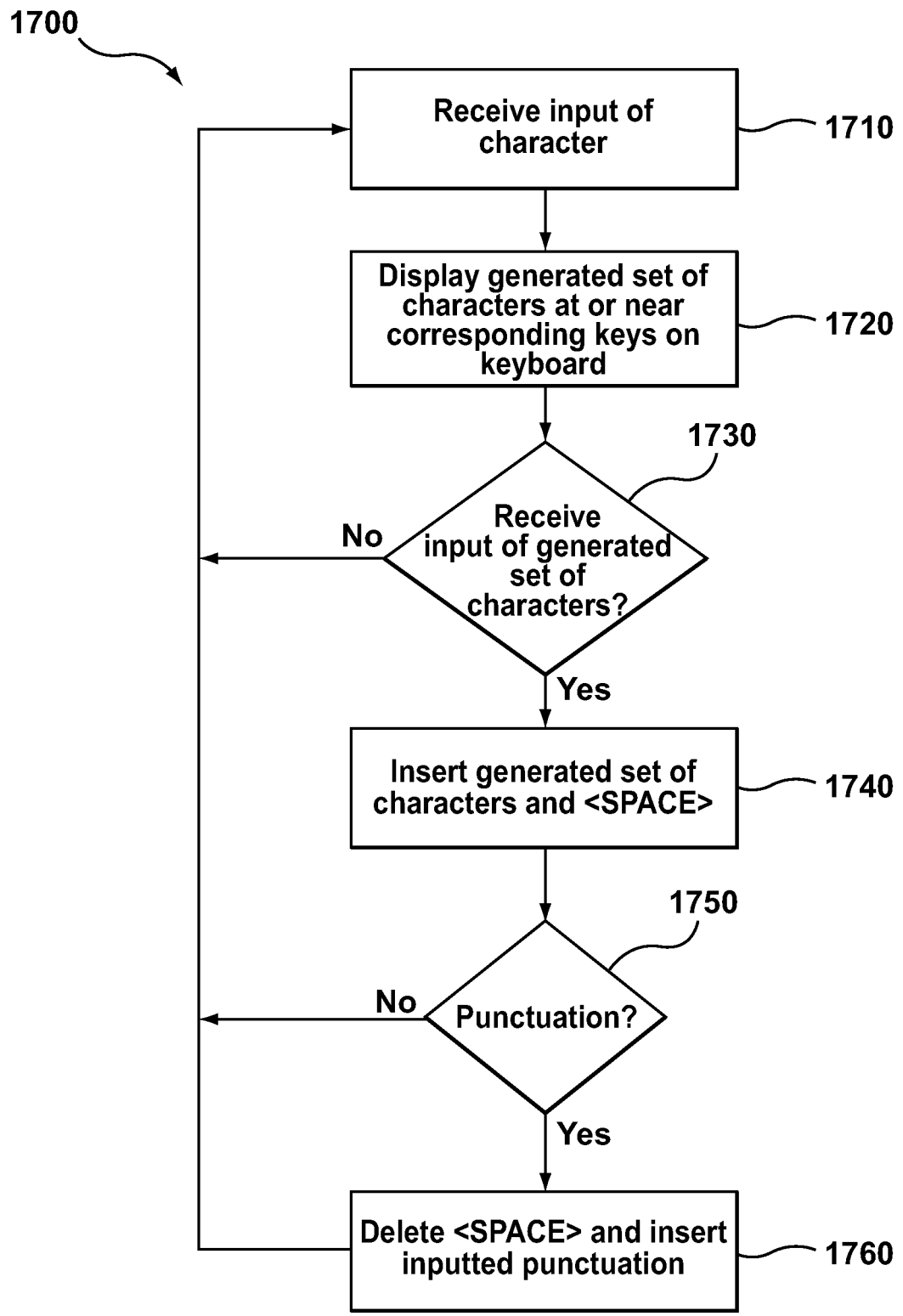
FIG. 17 is a flowchart illustrating an example method, consistent with embodiments disclosed herein.
Figure 18:
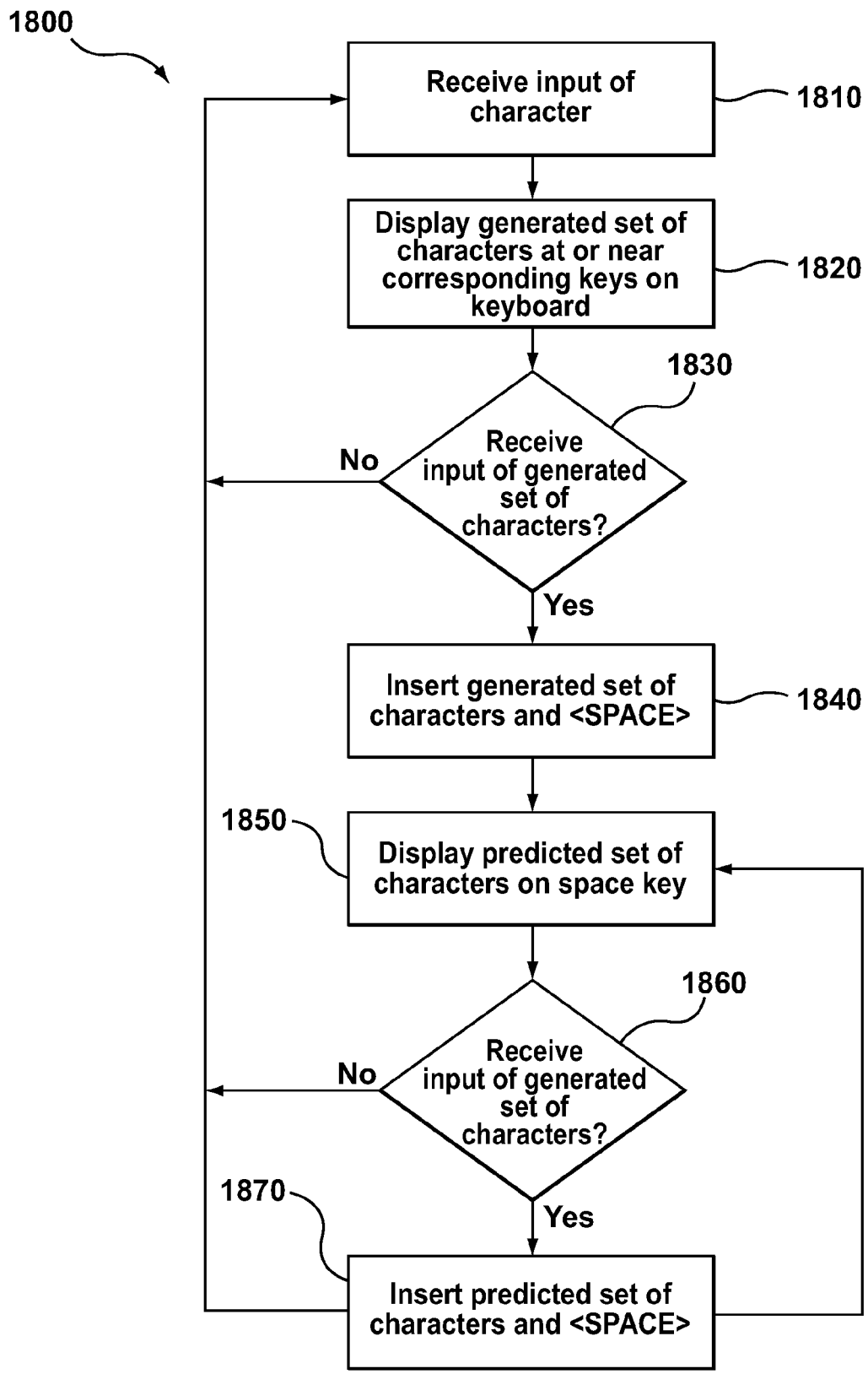
FIG. 18 is a flowchart illustrating an example method, consistent with embodiments disclosed herein.
Figure 19:
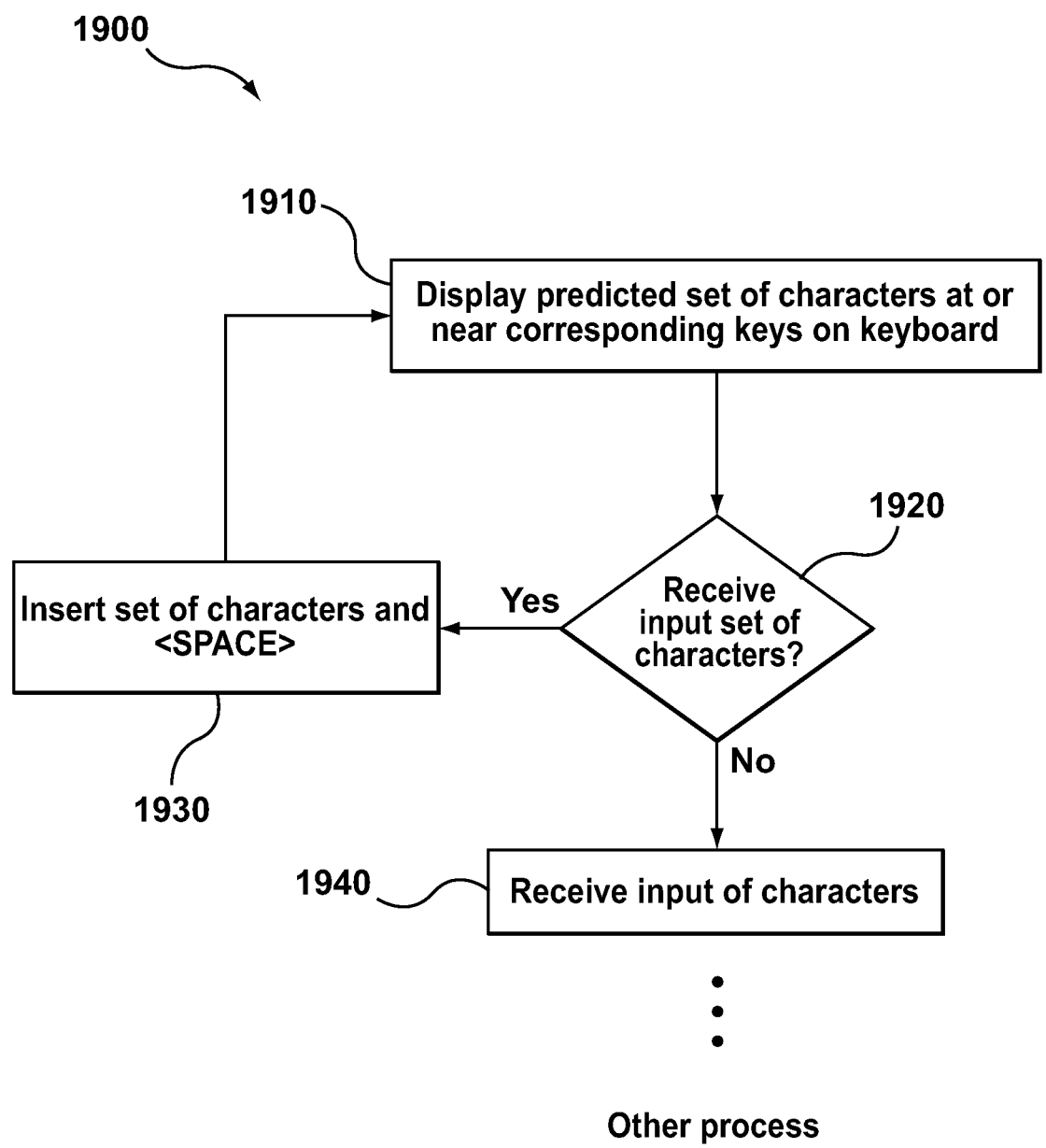
FIG. 19 is a flowchart illustrating an example method, consistent with embodiments disclosed herein.

The examples and embodiments illustrated in FIGS. 17, 18, and 19 can be implemented with any set of characters such as words, phrases, acronyms, names, slang, colloquialisms, abbreviations, or any combination thereof.

FIG. 17 shows in flowchart form a method 1700 in accordance with some embodiments. Method 1700 can be implemented with a processor, such as main processor 102, and stored on a tangible computer readable medium, such as hard drives, CDs, DVDs, flash memory, and the like. At block 1710, the processor receives an input of a character. At block 1720, the processor displays a generated set of characters at or near keys of subsequent candidate input characters on the touchscreen, such as described above.

At block 1730, the processor receives an input of the generated set of characters chosen by a user. If the user does not choose a generated set of characters displayed at or near keys of subsequent candidate input characters, the method restarts at block 1710, where the touchscreen can receive an input of another character. If a generated set of characters is received as input, at block 1740 the generated set of characters and a <SPACE> character is inserted in an input field (for example, input field 330 of FIGS. 3-9). As mentioned previously, the user can choose the generated set of characters, for example, by swiping at or near it or by long pressing a key corresponding to the subsequent candidate input character.

Continuing at block 1750, if the processor detects that punctuation is not to be inserted, the method restarts at block 1710. If punctuation is to be inserted, the method continues to block 1760 where the <SPACE> character is deleted and the appropriate punctuation is added to the input field. After block 1760, the method starts over at block 1710.

FIG. 18 is a flowchart illustrating example method 1800 in accordance with some embodiments. Method 1800 can be implemented with a processor, such as main processor 102, and stored on a tangible computer readable medium, such as hard drives, CDs, DVDs, flash memory, and the like. At block 1810, the processor receives an input of a character.

At block 1820, the processor displays a generated set of characters at or near a location on the keyboard corresponding to a subsequent candidate input character on a touchscreen. At block 1830, the processor receives an input of a generated set of characters chosen by a user. If the user does not choose a generated set of characters displayed at or near keys of subsequent candidate input characters, the method restarts at block 1810, where the processor can receive an input of another character. If a generated set of characters is received as input, at block 1840 the generated set of characters and a <SPACE> character is inserted in an input field (for example, input field 330 of FIGS. 3-9). As mentioned previously, the user can choose the generated set of characters, for example, by swiping at or near it or by pressing a key corresponding to the subsequent candidate input character for a predetermined period of time.

At block 1850, a predicted set of characters, different from the generated set(s) of characters, is displayed on a space key of the keyboard after the input of the generated set of characters in block 1830. The predicted set of characters displayed in block 1850 is determined by using a predictor. In some embodiments, the one or more predicted sets of characters can be placed on one or more keys other than the space key.

At block 1860, the processor can determine whether it has received an input of the predicted set of characters based on a user input. If the touchscreen has not received an input of the predicted set of characters because the user has not chosen the predicted set of characters, the method restarts at block 1810. If the processor has received the input of the predicted set of characters, the method continues to block 1870, where the chosen predicted set of characters and a <SPACE> character is inserted in the input field. From here, method 1800 can return to either block 1810 or block 1850.

Even though method 1800 does not display the punctuation illustration as shown in method 1700, the punctuation illustration, as shown in blocks 1750 and 1760, can likewise be applied to method 1800.

FIG. 19 is a flowchart illustrating an example method 1900 in accordance with some embodiments. At box 1910, predicted set of characters is displayed at corresponding subsequent candidate input characters. In these embodiments, an input has not been received or a delimiter has been activated, such as inputting a <SPACE>. Here, one or more predicted set of characters (such as, words, affixes, or a combination thereof) are placed on subsequent candidate input characters that correspond to the first letter of the generated set of characters. Moving to box 1920, it is determined whether the touchscreen receives an input of the set of characters (such as, word or affix) based on a user's selection. If an input is received, the method moves to block 1930 where the predicted set of characters and a <SPACE> character are inserted into an input field. Then the method starts over at block 1910. If the touchscreen does not receive an input of the set of characters, the touchscreen is available to receive an input of a character (as described by block 1710 of FIG. 17 or block 1810 of FIG. 18) and proceed through methods (such as methods 1700 of FIG. 17 or 1800 of FIG. 18 or even method 1900 of FIG. 19).

Figure 20:
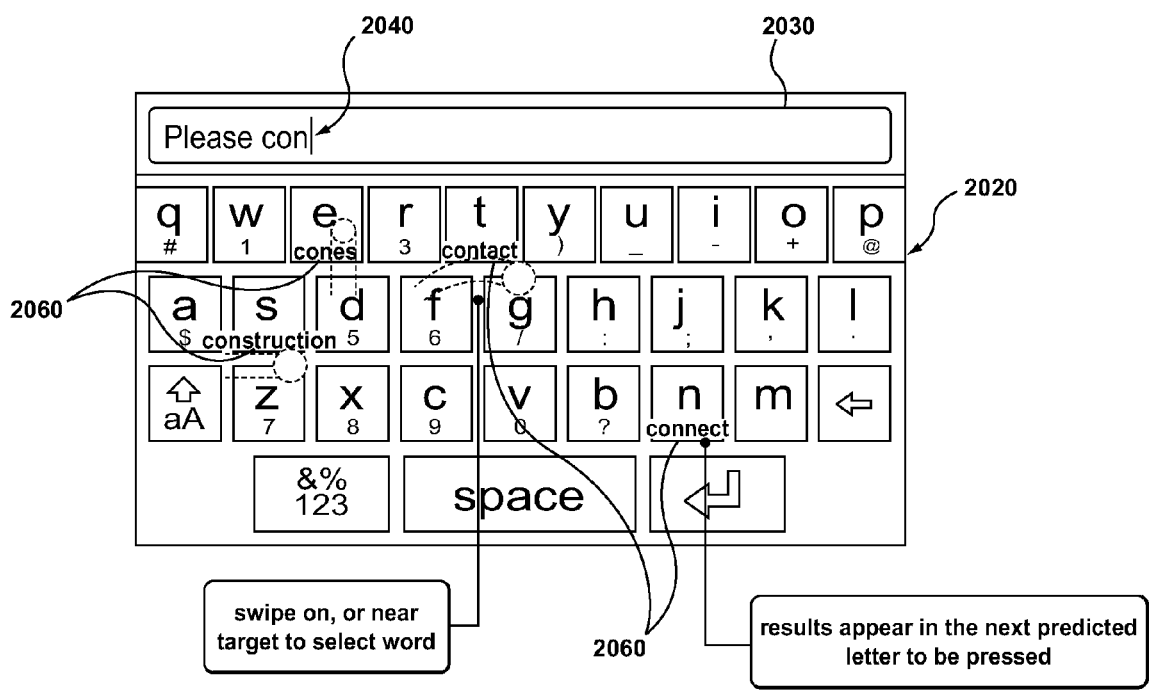
FIG. 20 shows an example front view of a virtual keyboard for display on a touchscreen, consistent with embodiments disclosed herein.

FIG. 20 shows another example of a virtual keyboard 2020 having an input field 2030. The set of characters "Please con" are received as input by the touchscreen and displayed in the input field 2030 followed by a cursor 2040, which can be a vertical line (as shown) or any other shape, such as an underscore as mentioned previously. A predictor determines one or more generated set of characters 2060 based in part on the received input for the current position of cursor 2040 within the current word, which is in the fourth character position of the current word, as shown in input field 2030. The current word is the word in which the cursor is currently located. In the shown example, generated set of characters 2060 "cones", "contact", "construction" and "connect" are displayed. Each generated set of characters 2060 is displayed at a key corresponding to a subsequent candidate input character (for example, under the E, T, S and N keys of the virtual keyboard 2020, respectively), for the current position of cursor 2040, which is in the third character position, as shown in input field 2030.

In the shown example, each generated set of characters 2060 is displayed at or near keys on the virtual keyboard 2020 associated with the subsequent candidate input characters. The display of a generated set of characters 2060 at or near a key corresponding to a subsequent candidate input character depends, for instance, on the size of the generated set of characters 2060 and the size of generated set of characters associated with nearby keys of other subsequent candidate input characters. When the generated set of characters associated with nearby keys in the same row of keys in the virtual keyboard 2020 are too large to be displayed at the same time without overlapping with each other or without a predetermined distance between the generated sets of characters, the processor 102 limits the generated set of characters which are displayed. The processor 102 may limit the generated set of characters which are displayed using one or any combination of the rank of each generated set of characters, the size of each generated set of characters, and a distance between each generated set of characters which are displayed so that a predetermined distance between the generated set of characters is maintained. This may result in the display of one or more generated sets of characters which are larger than the associated key in the virtual keyboard 2020.

In some examples, if two generated sets of characters are both ranked high, and these sets of characters would otherwise be displayed at nearby keys but cannot be displayed and still maintain a predetermined distance between the generated sets of characters at the display text size, the electronic device could be configured to display only the highest ranked generated set of characters. This results in the display of the most likely generated set of characters. In other examples, only the longest of the generated set of characters is displayed. This may be beneficial in that allowing faster entry of longer words saves time and processing cycles, thereby leveraging the predictive text input solution. In yet other examples, only the shortest generated set of characters is displayed. This may be beneficial in that shorter words can be more common, at least for some users, thereby allowing faster entry of words which saves time and processing cycles, thereby leveraging the predictive text input solution.

In some examples, the processor 102 may only limit the generated set of characters which are displayed in neighboring/adjacent keys in the same row of keys in the virtual keyboard 2020. In some examples, the processor 102 may limit the generated set of characters which are displayed in neighboring/adjacent keys in the same row of keys in the virtual keyboard 2020 so that a generated set of characters is never displayed in neighboring/adjacent keys irrespective of the size of the generated set of characters or distance between each generated set of characters. In such examples, the processor 102 uses the rank to determine which generated set of characters are displayed.

In other examples, the processor 102 can limit the generated set of characters which are displayed when the generated set of characters associated with nearby keys in different rows of keys in the virtual keyboard 2020 are too large to be displayed at the same time without overlapping with each other or without a predetermined distance between the generated sets of characters. In other examples, the processor 102 can limit the generated set of characters which are displayed when the generated set of characters associated with nearby keys in the same or different columns of keys in the virtual keyboard 2020 are too large to be displayed at the same time without overlapping with each other or without a predetermined distance between the generated sets of characters As mentioned previously, a user can use a finger or stylus to swipe a generated set of characters to input that generated set of characters. An individual letter, in contrast, can be input by tapping a respective key in the virtual keyboard 2020 using a finger or stylus. The touchscreen differentiates between tap and swipe events using movement and duration of touch events, the details of which are known in the art and need not be described herein. Each key in the virtual keyboard 2020 and each generated set of characters 2060 which is displayed has an associated target area on the touchscreen. The target area associated with each generated set of characters can be larger than and/or overlap with the target area of the key corresponding to the subsequent candidate input character with which it is associated and possibly nearby keys, such as neighboring keys in the same row. A user need only swipe on or nearby a displayed generated set of characters to input the generated set of characters. This permits faster input of a generated set of characters by creating larger and more accessible target areas, thereby saving time and processing cycles. In some examples, a generated set of characters can be input by detecting a swipe in any direction at or near the displayed generated set of characters. In other examples, a generated set of characters can only be input by detecting a swipe in a particular direction at or near the displayed generated set of characters. The particular direction may be associated with a direction in which the particular direction displayed generated set of characters (e.g., left or right in the shown example). In some examples, the swipe is at or near the displayed generated set of characters when the swipe has an initial contact point within the target area associated with the displayed generated set of characters (which may be the same or larger than the displayed generated set of characters).

Next Letter Prediction in Virtual Keyboard

Figure 21:
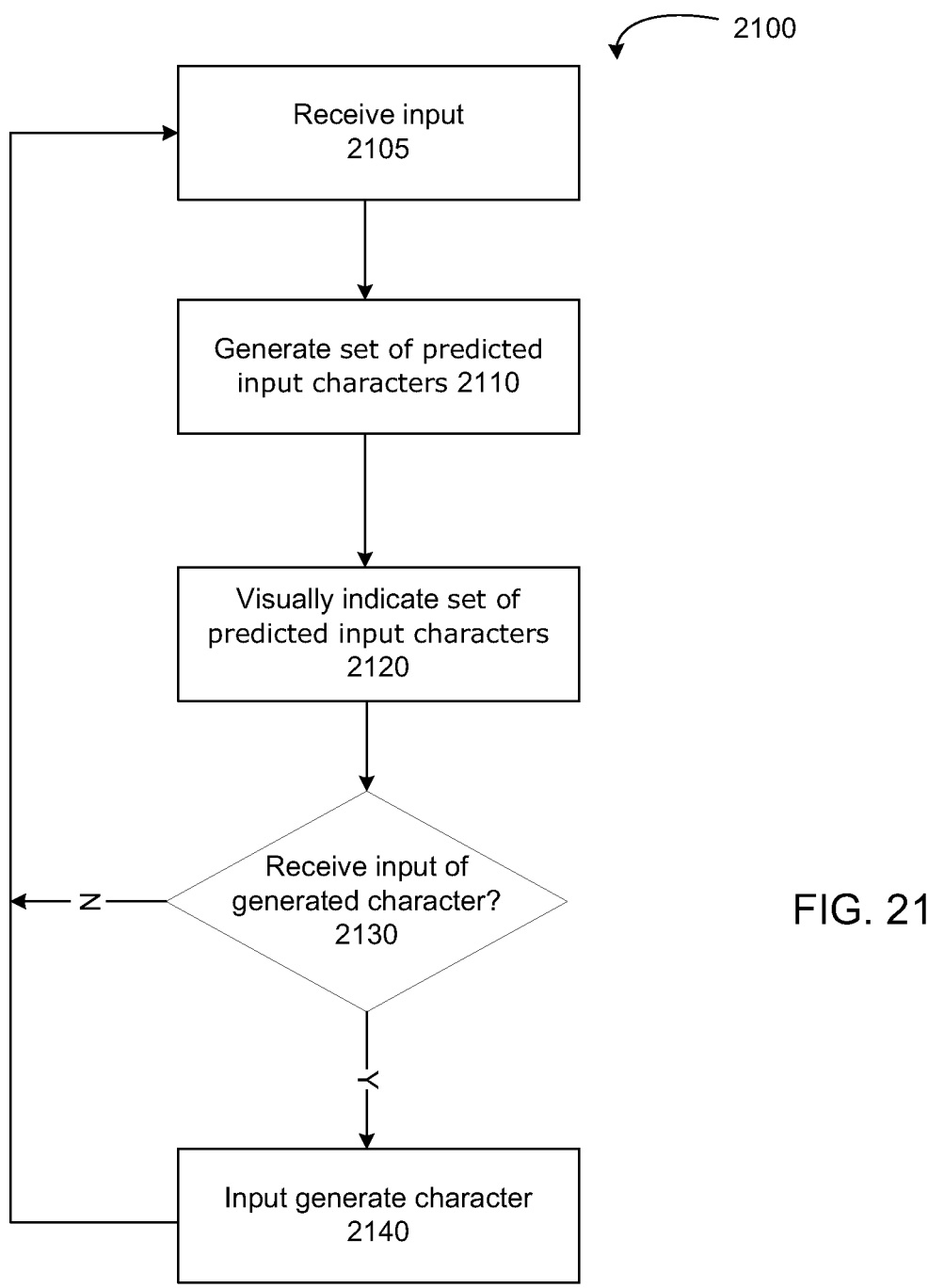
FIG. 21 is a flowchart illustrating an example method, consistent with embodiments disclosed herein.

FIG. 21 shows in flowchart form a method 2100 in accordance with some embodiments. Method 2100 can be implemented with a processor, such as main processor 102, and stored on a tangible computer readable medium, such as hard drives, CDs, DVDs, flash memory, and the like. At block 2110, the processor receives an input of a character. At block 2120, the processor generates one or more sets of predicted input characters. The one or more sets of predicted input characters correspond to subsequent candidate input characters, respectively. At block 2120, the processor displays a visual indication of at least some of the one or more sets of predicted input characters. The visual indication is displayed at keys of the virtual keyboard 2020 associated with subsequent candidate input characters corresponding to the at least some of the one or more sets of predicted input characters. Depending on the number of sets of predicted input characters which are generated, a visual indication may be displayed for only some of the sets of predicted input characters, typically the most likely sets of predicted input characters, which may be limited in number to a maximum (e.g., top five (5) predictions). The maximum is typically determined by optimizing GUI efficiency.

The visual indication of the keys associated with subsequent candidate input character may vary in dependence on the predictive rank of the sets of predicted input characters for which a visual indication is displayed. For example, the most highly ranked prediction may be shown with greater emphasis than other less highly ranked predictions. It will be appreciated that the most highly ranked prediction is presented within the virtual keyboard 2020 as the particular key of the virtual keyboard 2020 associated with the set of predicted input characters having the highest predictive rank. Other keys of the virtual keyboard 2020 associated with a set of predicted input characters are displayed using less visual emphasis.

In some examples, the particular key of the virtual keyboard 2020 associated with the set of predicted input characters having the highest predictive rank may displayed in a larger size or a different color than the other keys of the virtual keyboard 2020 associated with a set of predicted input characters (i.e., the other less highly ranked predictions)

In other examples, the particular key of the virtual keyboard 2020 associated with the set of predicted input characters having the highest predictive rank may be displayed using a first type of visual emphasis while the other keys of the virtual keyboard 2020 associated with a set of predicted input characters are displayed using a second type of visual emphasis different than the first type of visual emphasis.

In other examples, the particular key of the virtual keyboard 2020 associated with the set of predicted input characters having the highest predictive rank may be displayed using more than one type of visual emphasis (e.g., enlarging, backlighting, highlighting, underlining, bolding, italicizing, color differentiation, etc.) whereas other keys of the virtual keyboard 2020 associated with a set of predicted input characters are shown with only one type of visual emphasis.

The outline of a key, the character(s) displayed within the key, the background (or body) of the key, or a combination thereof may be visually emphasized by the visual indication. Other variations and combinations to provide the visual indication are possible.

The use of visual indication for predicted input characters allows a user to scan the virtual keyboard 2020 for instances of the visual indication, thereby facilitating a user of an electronic device to select a predicted input character and input text without diverting attention from the keyboard and subsequently refocusing. The visual indication may have a time based context. For example, the visual indication may decrease over time because as time progresses without input selecting a predicted input character, it is more likely that the predicted input characters are not useful or accurate.

In some examples, the size of the keys corresponding to the predicted input characters is increased relative to other keys in the virtual keyboard 2020. This facilitates a user of an electronic device to select a predicted input character and input text without diverting attention from the keyboard and subsequently refocusing. In some examples, the target areas associated with the keys corresponding to the predicted input characters is increased relative to other keys in the virtual keyboard 2020. The target area of the keys is the area of the touchscreen 118 in which a tap or other suitable input selects the corresponding input character associated with the key for input. The target areas associated with key of the virtual keyboard 2020 associated with a subsequent candidate input character may be increased relative to other keys in the virtual keyboard 2020, typically only those keys for which a visual indication is displayed. This also facilitates a user of an electronic device to select a predicted input character and input text without diverting attention from the keyboard and subsequently refocusing. The size of the keys corresponding to the predicted input characters, the size of the target areas associated with the key of the virtual keyboard 2020 associated with a subsequent candidate input character, or both, are part of the visual indication.

In other examples, a visual indication of unlikely characters (i.e., keys of the virtual keyboard which are not associated with a subsequent candidate input character are displayed in a default format of the virtual keyboard) may be deemphasized. The keys of the virtual keyboard associated with a subsequent candidate input character are displayed in a default format of the virtual keyboard while keys of the virtual keyboard which are not associated with a subsequent candidate input character are displayed in a different format which deemphasizes the keys. For example, the keys of the virtual keyboard associated with a subsequent candidate input character are displayed at a default size of the virtual keyboard while keys of the virtual keyboard which are not associated with a subsequent candidate input character are displayed at a smaller size than the default size. Deemphasizing unlikely input characters indirectly emphasizes the more likely input characters, and thereby facilitates a user of an electronic device to input text without diverting attention from the keyboard and subsequently refocusing.

In other examples, the processor may also generate a predicted word or other set of characters as mentioned previously, and display the predicted set of characters at or near a key corresponding to a subsequent candidate input character. In this way, the visual indication provided by the key and the display of the predicted word or other set of characters displayed at or near a key corresponding to a subsequent candidate input character both provide a visual indication of the prediction input, thereby further facilitating a user of an electronic device to input characters without diverting attention from the keyboard and subsequently refocusing.

At block 1730, the processor receives a designated input of a subsequent candidate input character in the set of predicted input characters chosen by a user. If the user does not choose a subsequent candidate input character in the set of predicted input characters, the method restarts at block 2210, where the touchscreen 118 can receive an input of another character. If a subsequent candidate input character in the set of predicted input characters is received as input, at block 2240 the subsequent candidate input character and a <SPACE> character is inserted in the input field 2030 of the virtual keyboard 2020. As mentioned previously, the user can choose a subsequent candidate input character, for example, by swiping at or near it or by long pressing a key corresponding to the subsequent candidate input character.

In some examples, the method continues with operations of block 1750 and 1760 (not shown) as mentioned previously in connection with the method 1700 and FIG. 17. Continuing at block 1750, if the processor detects that punctuation is not to be inserted, the method restarts at block 2110. If punctuation is to be inserted, the method continues to block 1760 where the <SPACE> character is deleted and the appropriate punctuation is added to the input field. After block 1760, the method starts over at block 2110.

While the method 2100 is described in the context of predicting the next letter in a word, the method could be adapted to predicting the next letter in the next word.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method, comprising:
 receiving an input of a character from a virtual keyboard displayed on a display;
 generating one or more sets of predicted input characters based on the input character, wherein each set of predicted input characters defines at least one subsequent candidate input character; and
 displaying a visual indication of at least one set of predicted input characters, wherein the visual indication comprises a display of all characters of the at least one set of predicted input characters superimposed over a key of the at least one subsequent candidate input character of the virtual keyboard;
 wherein a first type of input received at the key causes input of the character associated with the key and a second type of input received at or near the key causes input of the at least one set of predicted input characters, the first type of input being a tap input, and the second type of input being a long press input for a predetermined period of time or a swipe input from the key towards a displayed input field.

2. The method of claim 1, wherein the visual indication varies in dependence on a predictive rank of each of the at least one set of predicted input characters for which a visual indication is displayed.

3. The method of claim 2, wherein the visual indication of a first key of the virtual keyboard of a subsequent candidate input character of a first set of predicted input characters having a higher predictive rank provides a greater emphasis than the visual indication of a second key of the virtual keyboard of a subsequent candidate input character of a second set of predicted input characters having a lower predictive rank.

4. The method of claim 3, wherein the first key of the virtual keyboard is displayed in a larger size than the second key of the virtual keyboard.

5. The method of claim 3, wherein the first key of the virtual keyboard is displayed in a different color than the second key of the virtual keyboard.

6. The method of claim 3, wherein the first key of the virtual keyboard is displayed using a first type of visual emphasis while the second key of the virtual keyboard is displayed using a second type of visual emphasis different than the first type of visual emphasis.

7. The method of claim 3, wherein the first key of the virtual keyboard is displayed using more than one type of visual emphasis while the second key of the virtual keyboard is displayed using only one type of visual emphasis.

8. The method of claim 7, wherein the more than one type of visual emphasis include two or more of enlarging, backlighting, highlighting, underlining, bolding, italicizing and color differentiation, and the one type of visual emphasis is one of enlarging, backlighting, highlighting, underlining, bolding, italicizing or color differentiation.

9. The method of claim 1, wherein the visual indication progressively decreases over time.

10. The method of claim 1, wherein the key of the at least one subsequent candidate input character of the virtual keyboard is displayed in a default format of the virtual keyboard while keys of the virtual keyboard which are not associated with a character of a set of predicted input characters are displayed in a different format which deemphasizes the keys.

11. The method of claim 1, further comprising:
 increasing a target area associated with the key of the at least one subsequent candidate input character of the virtual keyboard for which a visual indication is displayed.

12. The method of claim 1, wherein the second type of input is the swipe input at or near the key of the at least one subsequent candidate input character of the virtual keyboard.

13. The method of claim 12, wherein the swipe input towards the displayed input field consists of an "up" swipe.

14. The method of claim 1, wherein there are at least two sets of predicted input characters, the at least two sets of predicted input characters sharing a common subsequent candidate input character and differing in at least one other subsequent candidate input character, and wherein the visual indication further comprises a display of all characters of one of the at least two sets of predicted input characters superimposed over the key of the common subsequent candidate input character and a display of all characters of another of the at least two sets of predicted input characters superimposed over a different key.

15. An electronic device, comprising:
 a processor;

a touchscreen display coupled to the processor, the touchscreen having a virtual keyboard displayed thereon;

wherein the processor is configured to receive an input of a character from the virtual keyboard, generate one or more sets of predicted input characters based on the input character, wherein each set of predicted input characters defines at least one subsequent candidate input character, and display a visual indication of at least one set of predicted input characters, wherein the visual indication comprises a display of all characters of the at least one set of predicted input characters superimposed over a key of the at least one subsequent candidate input character of the virtual keyboard;

wherein a first type of input received at the key causes input of the character associated with the key and a second type of input received at or near the key causes input of the at least one set of predicted input characters, the first type of input being a tap input, and the second type of input being a long press input for a predetermined period of time or a swipe input from the key towards a displayed input field.

16. The electronic device of claim 15, wherein the visual indication varies in dependence on a predictive rank of each of the at least one set of predicted input characters for which a visual indication is displayed.

17. The electronic device of claim 16, wherein the visual indication of a first key of the virtual keyboard of a subsequent candidate input character of a first set of predicted input characters having a higher predictive rank provides a greater emphasis than the visual indication of a character of a second key of the virtual keyboard of a subsequent candidate input character of a second set of predicted input characters having a lower predictive rank.

18. The electronic device of claim 15, wherein the processor is configured to increase a target area associated with the key of the virtual keyboard associated with the character of the at least one set of predicted input characters for which a visual indication is displayed.

19. A non-transitory computer program product having stored thereon computer-readable instructions for implementing a virtual keyboard on a touchscreen display of an electronic device, the instructions, when executed, causing the electronic device to:

display the virtual keyboard including a plurality of keys, each key corresponding to one or more different characters of a plurality of characters; and in response to receiving an input of a character, generate one or more sets of predicted input characters based on the input character, wherein each set of predicted input characters defines at least one subsequent candidate input character, and display a visual indication of at least one set of predicted input characters, wherein the visual indication comprises a display of all characters of the at least one set of predicted input characters superimposed over a key of the at least one subsequent candidate input character of the virtual keyboard;

wherein a first type of input received at the key causes input of the character associated with the key and a second type of input received at or near the key causes input of the at least one set of predicted input characters, the first type of input being a tap input, and the second type of input being a long press input for a predetermined period of time or a swipe input from the key towards a displayed input field.

* * * * *